(12) United States Patent
Grohmann et al.

(10) Patent No.: US 11,305,787 B2
(45) Date of Patent: Apr. 19, 2022

(54) VEHICLE CONTROL SYSTEM FOR AUTONOMOUS, REMOTELY-CONTROLLED, OR MANUAL OPERATION OF A VEHICLE

(71) Applicants: AIRBUS HELICOPTERS DEUTSCHLAND GMBH, Donauworth (DE); AIRBUS HELICOPTERS, Marignane (FR)

(72) Inventors: Boris Grohmann, Munich (DE); Thomas Rohr, Augsburg (DE); Nicolas Avril, Saint Marc Jaumegarde (FR); Axel Guse, Tapfheim (DE)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/898,685

(22) Filed: Jun. 11, 2020

(65) Prior Publication Data
US 2021/0122393 A1  Apr. 29, 2021

(30) Foreign Application Priority Data
Oct. 28, 2019  (EP) .................................... 19400023

(51) Int. Cl.
*B60W 60/00*  (2020.01)
*B60W 10/08*  (2006.01)

(52) U.S. Cl.
CPC ........ *B60W 60/0018* (2020.02); *B60W 10/08* (2013.01); *B60W 60/005* (2020.02)

(58) Field of Classification Search
CPC ........... B60W 60/0018; B60W 60/005; B60W 10/08; Y02T 50/40; B64C 13/04;
(Continued)

(56) References Cited

U.S. PATENT DOCUMENTS

2009/0234518 A1  9/2009  Irwin, III et al.
2010/0123045 A1  5/2010  Grieser
(Continued)

FOREIGN PATENT DOCUMENTS

DE   3830836 A1   3/1990
EP   2266878 B1   12/2010
(Continued)

OTHER PUBLICATIONS

European Search Report for European Application No. EP 19400023. 8, Completed by the European Patent Office, dated May 11, 2020, 16 pages.

*Primary Examiner* — Yi-Kai Wang
(74) *Attorney, Agent, or Firm* — Brooks Kushman P.C.

(57) ABSTRACT

A vehicle control system for controlling a vehicle and to a method of operating such a vehicle control system. The vehicle control system may include an inceptor adapted for controlling a servo-assisted control unit via a mechanical linkage, first and second force generating devices that are mechanically connected to the inceptor in parallel and provided for generating respective first and second forces that act in operation on the inceptor, a hands-on/off detection management unit, and a decoupling device that mechanically decouples the second force generating device from the inceptor based on a control signal from the hands-on/off detection management unit.

14 Claims, 12 Drawing Sheets

(58) Field of Classification Search
CPC ..... B64C 13/345; B64C 13/042; B64C 13/46; B64C 13/507; B64C 13/22; B64C 13/503; B64C 27/59; G05D 10/0061; G05D 1/0011; G05D 1/0088; G05B 19/04
USPC .......................................................... 701/36
See application file for complete search history.

(56) References Cited

U.S. PATENT DOCUMENTS

| | | | |
|---|---|---|---|
| 2011/0031346 A1 | 2/2011 | Allieta et al. | |
| 2016/0304190 A1* | 10/2016 | Grohmann | B64C 27/605 |
| 2019/0202545 A1* | 7/2019 | Medina | B64C 13/503 |

FOREIGN PATENT DOCUMENTS

| | | |
|---|---|---|
| EP | 2311729 A1 | 4/2011 |
| EP | 3069990 A1 | 9/2016 |
| EP | 3403927 A1 | 11/2018 |

* cited by examiner

VEHICLE CONTROL SYSTEM FOR AUTONOMOUS, REMOTELY-CONTROLLED, OR MANUAL OPERATION OF A VEHICLE

CROSS-REFERENCE TO RELATED APPLICATIONS

This application claims priority to European patent application No. EP 19400023.8 filed on Oct. 28, 2019, the disclosure of which is incorporated in its entirety by reference herein.

BACKGROUND OF THE INVENTION

(1) Field of the Invention

The present embodiments relate to a vehicle control system for controlling a vehicle. The present embodiments further relate to a method of operating such a vehicle control system.

(2) Description of Related Art

Conventional vehicle control systems may be used in any vehicle. For example, such vehicle control systems may be used in spacecrafts or aircrafts, such as spaceships, airplanes, helicopters, etc., land-operated vehicles such as cars, busses, trucks, trains, etc., or in watercrafts, such as ships, boats, hovercrafts, or submarines.

Vehicle control systems are often provided with mechanical control kinematics and servo-assisted control units that are controlled by suitable associated inceptors, such as control sticks, control columns, sidesticks, pedals, steering wheels and so on.

Artificial force feel generating devices are frequently used in vehicles that are controllable in a flowing medium, such as air or water. In other words, artificial force feel generating devices are used in spacecrafts, aircrafts, or in watercrafts.

By way of example, an artificial force feel generating device that is used in an aircraft is usually adapted for generating artificial breakout forces for an inceptor of a given servo-assisted control unit, such as a rudder, and additional optional artificial force gradients for convenient control of this inceptor by the pilot. The artificial breakout forces and additional optional artificial force gradients are forces that need to be overcome by the pilot when moving the inceptor from a predetermined neutral position into a respective operating position desired by the pilot.

The predetermined neutral position is a position of the inceptor that corresponds to a preferred motion direction of the aircraft and that is generally characterized in that in it no forces act on the inceptor. In other words, no forces need to be applied onto the inceptor in operation for keeping it in its neutral position.

A reel, e.g., centering and/or anchoring, feeling of the artificial breakout forces and the additional optional artificial force gradients usually becomes noticeable to the pilot of the aircraft when the inceptor passes a so-called trim point on its travel from the neutral position to the respective desired operating position. This trim point is slidable, i.e., adjustable within a defined control range by means of a trim coupling and/or a trim motor. However, in order to enable the pilot to sensitively control the aircraft, the artificial forces generated by the artificial force feel generating device, i.e., the artificial breakout forces and the additional optional artificial force gradients, should be relatively moderate.

Document EP 3 069 990 A1 describes a vehicle control system with an artificial force feel generating device for generation of an artificial feeling of force on an inceptor of the vehicle control system, said inceptor being adapted for controlling a servo-assisted control unit of said vehicle control system via a mechanical linkage, wherein at least one first force generating device and at least one second force generating device are mechanically connected to said inceptor, said first force generating device being provided for generating a force acting in operation on said inceptor and said second force generating device being provided for generating a tactile cue force acting in operation on said inceptor, said first and second force generating devices being arranged in parallel.

Other exemplary artificial force feel generating devices are described in documents EP 2 266 878 B1, EP 2 311 729 A1, and US 2010/0123045 A1. In these artificial force feel generating devices, a force applied to a corresponding inceptor by the pilot is measured by an external force or pressure sensor for controlling the devices on the basis of the measured force.

Sometimes, it may be desirable to provide the capability to operate a vehicle manned or unmanned. If an automatic flight control system (AFCS) is used with the aircraft, the artificial breakout forces are usually used to support a respective input of AFCS actuator signals onto the inceptor. The forces that can be applied to the inceptor by such an AFCS are, thus, limited by the artificial breakout forces.

In operation of the aircraft, any overcoming of the artificial breakout force or movement in the region of the additional optional artificial force gradients is generally assessed by the AFCS as being an intended intervention by the pilot and, thus, results in temporary degradation of the AFCS operating mode in order to prevent the pilot and the AFCS from working against each other.

For remotely-controlled or autonomous operation, conventional vehicle control systems have to be adapted in order to enable operation without a vehicle operator and to meet increased safety requirements, for example when operating in areas with high traffic. As an example, additional actuators and sensors are often included in these vehicle control systems to be able to handle different failure cases which would normally be handled by the vehicle operator.

Examples of different failure cases may include the loss or degradation of stabilization, the jam of a servo-assisted control unit, the jam of an actuator, or the loss of hydraulic operating force augmentation. Conventional vehicle control systems have dealt with these problems in different ways. For example, some vehicle control systems for aircraft have provided redundant arrangements of trim actuators and/or trim actuators that are comparatively slow while having the full stroke capability as well as a dual automatic flight control system (AFCS).

BRIEF SUMMARY OF THE INVENTION

It is, therefore, an objective to provide a new vehicle control system for controlling a vehicle that overcomes the above described shortcomings and enable manned as well as unmanned operation of the vehicle. Further objectives relate to providing a method of operating such a new vehicle control system. Furthermore, the new vehicle control system is preferably cost effective and easy to retrofit.

The objective is solved by a vehicle control system comprising the features of claim 1 and by a method of operating such a vehicle control system, the method comprising the features of claim 10. More specifically, the vehicle control system for controlling a vehicle, comprises a servo-assisted control unit, a mechanical linkage that is coupled to the servo-assisted control unit, an inceptor adapted for controlling the servo-assisted control unit via the mechanical linkage, a first force generating device that is mechanically connected to the inceptor and provided for generating a first force that acts in operation on the inceptor, a second force generating device that is mechanically connected to the inceptor in parallel to the first force generating device and provided for generating a second force that acts in operation on the inceptor, a hands-on/off detection management unit that is connected to the inceptor, configurable to operate in manned operation mode or in unmanned operation mode, and generates a control signal based on detecting a manual or automatic operation of the vehicle, and a decoupling device that is operable on the basis of the control signal and coupled between the second force generating device and the inceptor, wherein the decoupling device mechanically decouples the second force generating device from the inceptor.

Illustratively, a modular device may be added to the classical vehicle control system and to the AFCS in order to replace the pilot and enable autonomous or remotely-controlled operation.

As an example, the modular device that replaces the pilot may be installed above the cockpit floor (e.g., installed instead of the pilot seat). As another example, the modular device may be installed below the cockpit floor.

By way of example, the vehicle control system may include a tactile cue trim. The tactile cue trim may have a clutch that serves as a safety device.

If desired, the vehicle control system may have redundant and dissimilar devices (e.g., one or more sensors) for detecting a presence of a vehicle operator. Detecting the presence of a vehicle operator and/or whether the vehicle operator is about to intervene in operating the vehicle control system is sometimes also referred to as hands-on detection, hands-off detection, or hands-on/off detection.

In particular, detecting the presence of a vehicle operator and detecting that the vehicle operator is about to intervene in operating the vehicle control system is sometimes also referred to as "the vehicle operator is hands-on". Detecting the absence of a vehicle operator or detecting the presence of a vehicle operator and detecting that the vehicle operator is not about to intervene in operating the vehicle control system is sometimes also referred to as "the vehicle operator is hands-off".

Illustratively, the vehicle control system may include a secondary AFCS in addition to the primary AFCS. If desired, the primary and/or the secondary AFCS may have a direct connection to enable a power stage, to generate and handle tactile cues, and/or to switch between high speed/ high torque and low speed/low torque.

A method of operating the vehicle control system may include operations and devices for failure detection and operations that reconfigure the vehicle control system in unmanned operation mode when failures have been detected. As an example, failure of the primary and/or the secondary AFCS, failure of a hydraulic servo, and/or jam of the increased performance trim actuator (IPTA) and/or the classical trim actuator may be detected.

In response to detecting failure of the primary and/or the secondary AFCS, failure of a hydraulic servo, and/or jam of the increased, performance trim actuator (IPTA) and/or the classical trim actuator, the vehicle control system may reconfigure the primary and/or the secondary AFCS, the classical trim actuator, the increased performance trim actuator (IPTA), the serial, electromechanical actuator (SEMA) and/or the increased performance serial actuator (IPSA).

If desired, illustrative vehicle control systems may be based on retrofitted existing vehicle control systems. As an example, illustrative vehicle control systems may allow for unchanged manned operations compared to existing vehicle control systems. As another example, illustrative vehicle control systems may re-use a fly by wire (FBW) architecture, existing AFCS, existing Aeronautical Radio Inc. (ARINC) 429 bus lines, existing mechanically commanded hydraulic servos, and/or mechanical flight control kinematics.

By way of example, the illustrative vehicle control system may include additional elements compared to existing vehicle control systems to allow for remote-controlled and/ or autonomous operation of the vehicle. As an example, the illustrative vehicle control system may include an additional number of bus lines (e.g., ARINC 429 bus lines), a secondary AFCS, and/or additional actuators such as increased performance trim actuators (IPTA). IPTA are capable of speeds that are at least a factor of two in the order of magnitude higher than those of classical trim actuators.

Illustratively, the vehicle control system should be capable of remote-controlled and/or autonomous operation with a failure rate that is smaller than $10^{-9}$ per flight hour of operation in public airspace and/or above an inhabited area.

According to one aspect, the mechanical linkage further comprises at least one serial electromechanical actuator that is coupled between the inceptor and the servo-assisted control unit.

According to one aspect, the hands-on/off detection management unit deactivates the second force generating device when the control signal is indicative of an automatic operation of the vehicle and the hands-on/off detection management unit is configured to operate in manned operation mode.

According to one aspect, the second force generating device further comprises at least one motor driver, wherein the hands-on/off detection management unit instructs the at least, one motor driver to deactivate the second force generating device when the control signal is indicative of an automatic operation of the vehicle and the hands-on/off detection management unit is configured to operate in manned operation mode.

According to one aspect, the first force generating device further comprises a mechanical force generating unit in the first force generating device; a first sensor in the first force generating device that is coupled to the mechanical force generating unit, generates a first sensor signal based on detecting a manual or automatic operation of the vehicle/and transmits the first sensor signal to the hand-on/off detection management unit; and a second sensor that is dissimilar from the first sensor and coupled to the inceptor, wherein the second sensor generates a second sensor signal based on detecting a manual or automatic operation of the vehicle, and transmits the second sensor signal to the hand-on/off detection management unit.

According to one aspect/the decoupling device comprises a clutch that decouples the second force generating device from the inceptor when the control signal is indicative of an automatic operation of the vehicle.

According to one aspect, the clutch couples the second force generating device to the inceptor when the control signal is indicative of a manual operation of the vehicle or when the first force generating device is defective.

According to one aspect, the vehicle control system further comprises a primary motion control system that is adapted for driving the first and second force generating devices.

According to one aspect, the vehicle control system further comprises a secondary motion control system that is independent from the primary motion control system and adapted for driving the second force generating device; and a selector circuit that is coupled between the primary and secondary motion control system and the second force generating device, wherein the selector circuit connects one of the primary and secondary motion control system with the second force generating device.

Furthermore, a method of operating a vehicle control system that controls a vehicle and comprises a servo-assisted control unit, a mechanical linkage that is coupled to the servo-assisted control unit, an inceptor adapted for controlling the servo-assisted control unit via the mechanical linkage, a first force generating device that is mechanically connected to the inceptor, a second force generating device that is mechanically connected to the inceptor in parallel to the first force generating device, a hands-on/off detection management unit that is connected to the inceptor, and a decoupling device that is coupled between the second force generating device and the inceptor, comprises the operations of configuring the hands-on/off detection management unit to operate in manned operation mode or in unmanned operation mode, in response to configuring the hands-on/off detection management unit to operate in manned operation mode: using the hands-on/off detection management unit to generate a control signal that is indicative of a manual intervention of a vehicle operator, and enabling or disabling the second force generating device based on the control signal from the hands-on/off detection management unit; and in response to configuring the hands-on/off detection management unit to operate in unmanned operation mode: using an automatic motion control system to control a position of the vehicle, using the hands-on/off detection management unit to generate a control signal that is indicative of a malfunction of the vehicle control system, and operating the decoupling device that is coupled between the second force generating device and the inceptor based on the control signal from the hands-on/off detection management unit.

According to one aspect, enabling or disabling the second force generating device based on the control signal from the hands-on/off detection management unit further comprises: in response to the control signal being indicative of no manual intervention of the vehicle operator, decoupling the second force generating device from the inceptor.

If desired, enabling or disabling the second force generating device based on the control signal from the hands-on/off detection management unit may include in response to the control signal being indicative of no manual intervention of the vehicle operator, instruct a motor driver to deactivate the second force generating device to prevent the creation of tactile cues by the second force generating device.

According to one aspect, using the hands-on/off detection management unit to generate the control signal that is indicative of a malfunction of the vehicle control system, and operating the decoupling device that is coupled between the second force generating device and the inceptor based on the control signal further comprises: using a sensor in the first force generating device to detect an increase in control forces caused by a degradation of the servo-assisted control unit; and using the second force generating device for trim and stabilization by coupling the second force generating device with the inceptor.

According to one aspect, the method further comprises: detecting a jam of the first force generating device; using the second force generating device for trim by coupling the second force generating device with the inceptor; and using an additional decoupling device in the first force generating device to decouple the first force generating device from the inceptor.

According to one aspect, the mechanical linkage comprises serial electromechanical actuators, and the method further comprises: detecting a total loss of the serial electromechanical actuators; and using the secondary force generating device for trim and stabilization by coupling the second force generating device with the inceptor.

According to one aspect, the method further comprises: detecting a defect of the primary motion control system; and using a selector circuit that is coupled between the automatic motion control system and the second force generating device to switch from the primary to the secondary motion control system as input to the second force generating device and as input to a serial electromechanical actuator of the serial electromechanical actuators.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
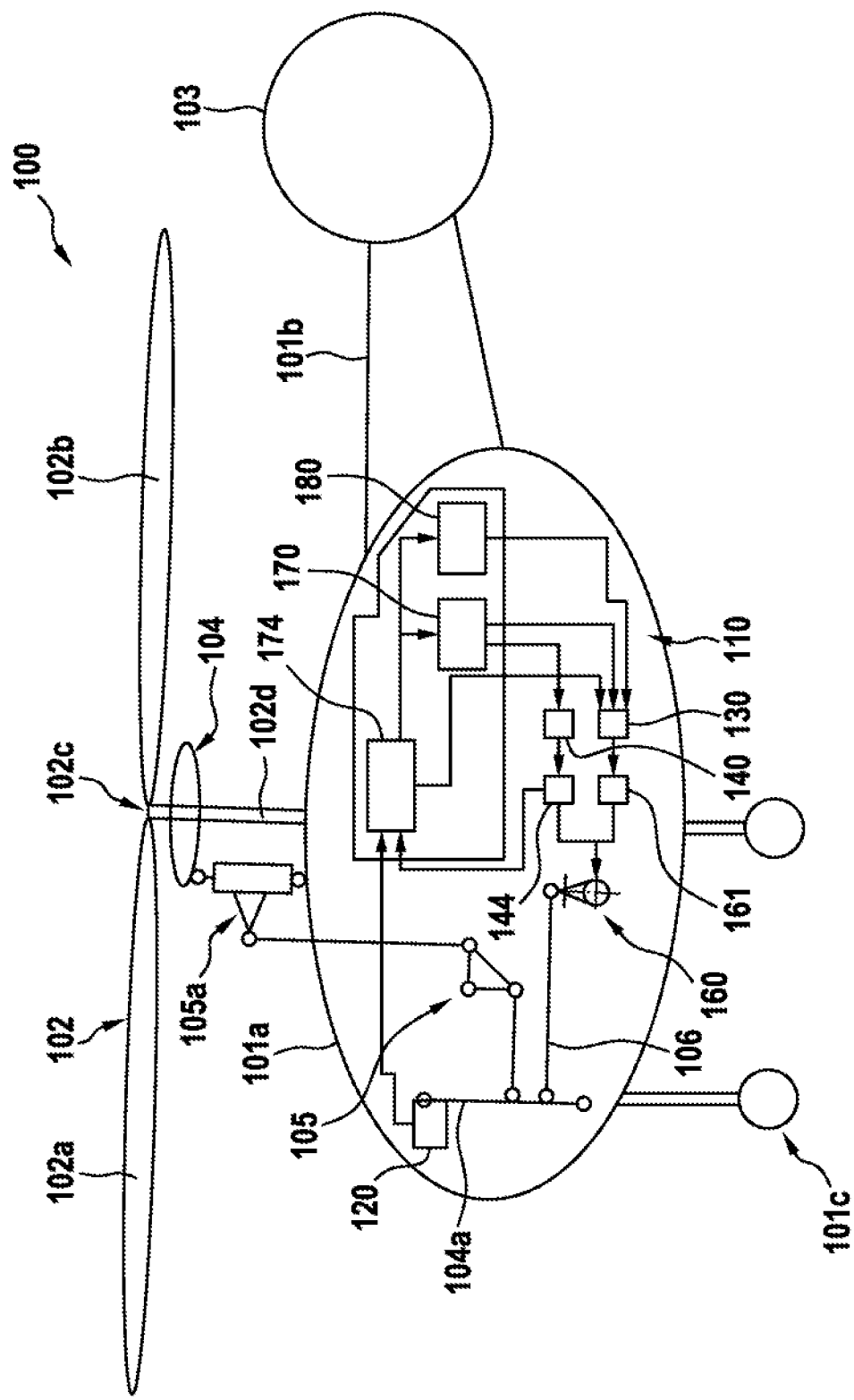
FIG. 1 is a diagram of an illustrative rotary wing aircraft with a vehicle control system in accordance with some embodiments.

FIG. 1 shows a vehicle 100 that is exemplarily illustrated as an aircraft, in particular as a rotary wing aircraft and, more, particularly, as a helicopter. Thus, for purposes of simplicity and clarity, the vehicle 100 is hereinafter referred to as the "helicopter" 100. It should, however, be noted that the present embodiments are not limited to helicopters and can likewise be applied to any other vehicle that is operable in the air, on land, or in water, independent of a particular configuration thereof.

Illustratively, helicopter 100 comprises fuselage 101a that is connected to a landing gear 101c, which is embodied as a wheel-type landing gear by way of example, and defines a tail boom 101b. Landing gear could also be replaced by skids. The helicopter 100 further comprises at least one main rotor 102 for providing lift and forward, backward or sideward thrust during operation.

The main rotor 102 is exemplarily embodied as a multi-blade main rotor that comprises a plurality of rotor blades 102a, 102b that are mounted at an associated rotor head 102c to a rotor mast 102d, which rotates in operation of the helicopter 100 around an associated rotor axis defined by the rotor mast 102d.

By way of example, the helicopter 100 further comprises at least one counter-torque device 103 configured to provide counter-torque during operation, i.e., to counter the torque created by rotation of the at least one multi-blade main rotor 102 for purposes of balancing the helicopter 100 in terms of yaw. The at least one counter-torque device 103 is illustratively implemented by a tail rotor at an aft section of the tail boom 101b, and therefore also referred to as the "tail rotor" 103 hereinafter.

According to one aspect, the helicopter 100 comprises at least one pitch control unit 104 for controlling collective and cyclic pitch of the rotor blades 102a, 102b of the at least one multi-blade main rotor 102 in operation. This pitch control unit 104 may be arranged between the rotor head 102c and the fuselage 101a of the helicopter 100. If desired, the pitch control unit 104 may be implemented by means of a swash plate assembly.

It should be noted that a suitable swash plate assembly that can be used for realizing the pitch control unit 104 and its functionality are well-known to the person skilled in the art. Therefore, a detailed description of the pitch control unit 104, i.e., the swash plat assembly, is omitted for brevity and conciseness.

Illustratively, pitch control unit 104 is servo-assisted by an associated servo-assisted control unit 105a, such as a hydraulic power unit, which is controlled by means of an inceptor 104a via an associated mechanical linkage 105. It should be noted that for purposes of simplicity and clarity of the drawings only a single channel related to pitch control of the helicopter 100 is shown with respect to the associated servo-assisted control unit 105a and the mechanical linkage 105. However, generally three channels are provided, i.e., a first channel related to longitudinal pitch control, a second channel related to roll control, and a third channel related to collective control of the helicopter 1.

The inceptor 104a is illustratively embodied as a cyclic stick that is supposed to be provided for controlling the cyclic pitch of the rotor blades 102a, 102b only, while the collective pitch is supposed to be controlled by a separate inceptor. Therefore, the inceptor 104a is also referred to as the "cyclic pitch inceptor" 104a hereinafter, for simplicity and clarity.

The mechanical linkage 105 comprises e.g., push/pull control rods, bellcranks, torsion shafts, and/or a flexball assembly and is well-known to the person skilled in the art. Therefore, a detailed description of the mechanical linkage 105 is omitted for brevity and conciseness.

The vehicle control system 110 comprises a hands-on/off detection management unit 174. Hands-on/off detection management unit 174 may detect the presence of a vehicle operator and/or whether the vehicle operator is about to intervene in operating the vehicle control system 110. Detecting the presence of a vehicle operator and/or whether the vehicle operator is about to intervene in operating the vehicle control system is sometimes also referred to as hands-on detection, hands-off detection, or hands-on/off detection.

In particular, detecting the presence of a vehicle operator and detecting that the vehicle operator is about to intervene in operating the vehicle control system 110 is sometimes also referred to as "the vehicle operator is hands-on". Detecting the absence of a vehicle operator or detecting the presence of a vehicle operator and detecting that the vehicle operator is not about to intervene in operating the vehicle control system 110 is sometimes also referred to as "the vehicle operator is hands-off".

If desired, hands-on/off detection management unit 174 may be coupled to at least one of sensor 120 or sensor 144.

By way of example, sensor 144 may be associated with the first force generating device 140 and linked to the rotary output unit 160.

Illustratively, sensor 120 may be associated with cyclic pitch inceptor 104a. Sensors 120, 144 may detect the presence of a vehicle operator (e.g., a pilot, a driver, a conductor, a helmsman, a captain, etc.) and/or whether the vehicle operator is about to intervene in operating the vehicle control system 110. Thus, sensors 120, 144 are sometimes also referred to as hands-on detection sensor, hands-on/off sensor, or hands-on detection device.

Sensor 120, 144 is connected to, and as such part of, vehicle control system 110. If desired, vehicle control system 110 may have redundant and dissimilar devices for detecting a presence of a vehicle operator (e.g., sensors 120, 144) and a hands-on/off detection management unit 174 in order to evaluate and consolidate the information provided by the redundant and dissimilar devices.

Vehicle control system 110 may comprise force generating devices 130, 140 for generation of a force on the cyclic pitch inceptor 104*a*. More specifically, the latter is preferably connected via a mechanical connection 106 to an output unit 160 of the force generating devices 130, 140, which is also part of the vehicle control system 110.

The force generating devices 130, 140 may be controlled by primary and secondary automatic flight control system (AFCS) 170, 180. More specifically, the primary and secondary AFCS 170, 180 provide commands for the force generating devices 130, 140 including a respective configuration of tactile cues that are implemented by the force generating devices 130, 140.

In cases in which the force generating devices 130, 140 are used with a vehicle other than the helicopter 100, the primary and secondary AFCS 170, 180 more generally implements an automatic motion control system of that vehicle.

If desired, the automatic motion control systems 170, 180 may be adapted for providing predictors for the limits of the performance and flight domain of helicopter 100 as well as for providing corresponding tactile cues. For example, automatic motion control systems 170, 180 may be electrically connected to one or more sensors 120, 144 by means of suitable interfaces and control force generating devices 130, 140 on the basis of information received from hands-on/off detection management unit 174 (e.g., provided by sensors 120, 144) in operation of the helicopter 100.

Force generating device 130 may be connected to the rotary output unit 160 via safety unit 161. Safety unit 161 may be provided for limiting authority of the force generating device 130. In particular, internal failures or malfunctions such as jamming may be prevented to have catastrophic impact on the vehicle by means of safety unit 161. Safety unit 161 is sometimes also referred to as coupling device or decoupling device.

Figure 2A:
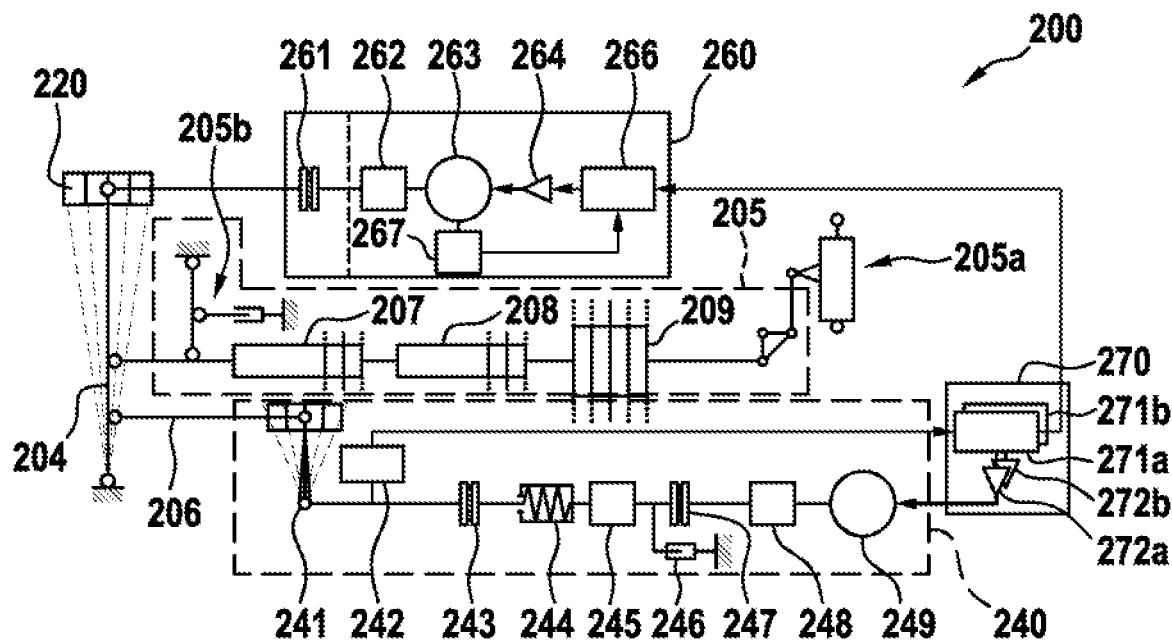
FIG. 2A is a diagram of an illustrative vehicle control system with an unmanned operation enabling device installed above a vehicle operator level in accordance with some embodiments.

FIG. 2A shows an embodiment of vehicle control system 200 with inceptor 204, hands-on/off sensor 220, mechanical, linkage 205, and automatic motion control system 270 with is illustratively embodied by AFCS 270. By way of example, mechanical linkage 205 is provided with an optional friction and damping unit 205*b*. servo-assisted control unit 205*a*, mechanical connection 206, first serial electromechanical actuator 207, second serial electromechanical actuator 208, and mechanical linkage 209.

By way of example, serial electromechanical actuators 207, 208 may be coupled in series within the mechanical linkage 205 between inceptor 204 and servo-assisted control unit 205*a* so that the vehicle control system 200 can move the servo-assisted control unit 205*a* independent from the movement of the inceptor 204, in particular superimpose high speed or high frequency movement to the movement of servo-assisted control unit 205*a* for stabilization.

Hands-on/off sensor 220, 244 may be connected to inceptor 204. Sensor 220, 244 may generate a sensor signal based on detecting a presence of a vehicle operator. A vehicle operator may be any physical person that operates the vehicle using a vehicle control system, including a pilot, a driver, a conductor, a helmsman, a captain, etc.

As an example, in autonomous (e.g., unmanned) or remotely-controlled operation or when the vehicle operator is not actively interacting with vehicle control system 200, hands-on/off sensor 220, 244 may generate a sensor signal indicative of an absence of the vehicle operator. As another example, in manned operation, when the vehicle operator is actively interacting with vehicle control system 200, hands-on/off sensor 220, 244 may generate a sensor signal indicative of a presence of the vehicle operator.

If desired, vehicle control system 200 may include at least one first force generating device 240 and at least one second force generating device 260, both of which are mechanically connected to the inceptor 204.

The first force generating device 240 may be provided for generating a first force that acts in operation on inceptor 204. The second force generating device 260 may be provided for generating a second force that acts in operation on inceptor 204. The forces may act in operation on the inceptor 204 for moving the latter into a neutral position. This neutral position may define a trim point that determines a preferred motion direction of the vehicle (e.g., helicopter 100 of FIG. 1).

Illustratively, first force generating device 240 may be implemented as a conventional gradient trim actuator for generating the first force, which is well-known to the person skilled in the art. Therefore, the first force generating device 240 is also referred to as the "gradient trim actuator" 240 hereinafter, for simplicity and clarity.

First force generating device 240 may include output unit 241, which may be implemented as a rotary output unit. If desired, mechanical connection 206 may couple output unit 241 to inceptor 204. Illustratively, output unit 241 may be connected to an output position sensor 242 that is adapted for monitoring a rotational position of the rotary output unit 241 in operation.

Output unit 241 and output position sensor 242 may be separated from the remaining components of first force generating device 240 by a safety unit 243. The safety unit 243 may disconnect at least some components of the first force generating device 240 from the inceptor 204 while output position sensor 242 remains connected.

As shown, first force generating device 240 may include at least one mechanical force generating unit 244, which may be implemented as a spring unit 244 that is connected to safety unit 243. A respective spring force provided by spring unit 244 may define the force provided by the first force generating device 240. If desired, the respective spring force provided by spring unit 244 may be adjustable by means of reversible gear unit 245.

If desired, the mechanical force generating unit 244 may include a sensor for hands-on/off detection as described above. In some embodiments, the sensor for hands-on/off detection may be arranged separately from the mechanical force generating unit 244 (e.g., sensor 344 of FIGS. 3A, 3B, 5, 6, 7 is shown separate from mechanical force generating unit 244). In other words, in these embodiments, the mechanical force generating unit 244 may not include a sensor for hands-on/off detection.

Reversible gear unit 245 may be connected to a coupling unit 247 and, in parallel thereto, to a release damping unit 246. The coupling unit 247 may be connected via an irreversible gear unit 248 to an electrical motor 249.

Electrical motor 249 may be embodied as a brushed DC motor. Electrical motor 249 may maintain the coupling unit 247 in operation in a coupling state. Illustratively, the safety unit 243, the spring unit 244, the reversible gear unit 245, the coupling unit 247, the irreversible gear unit 248 and the brushed DC motor 249 may define the first force generating device 240.

According to one aspect, coupling unit 247 may be embodied as a trim release unit that is adapted for coupling the spring unit 244 to the inceptor 204. Trim release unit 247 may be activatable by the vehicle operator. In other words, the vehicle operator may decouple spring unit 244 and, thus, the first force generating device 240 from inceptor 204. If desired, the second force generating device 260 may remain mechanically connected to inceptor 204 when spring unit 244 is de-coupled from inceptor 204.

It should be noted that, due to the irreversible gear 248, provision of the force by the spring unit 244 is maintained even if a loss of electrical power supply or of the brushed DC motor 249 occurs in operation. Only if the coupling unit 247 is activated by the vehicle operator for de-coupling the spring unit 244 from the inceptor 204, provision of the force is annulated for the convenience of the vehicle operator.

If desired, the brushed DC motor 249 is controlled by automatic motion control system 270. As shown, automatic motion control system 270 may include redundant first and second control and monitoring units 271a, 271b and redundant first and second motor drivers 272a, 272b.

First and second motor drivers 272a, 272b may each include a pulse width modulator for controlling the brushed DC motor 249 via a suitable pulse width modulated control signal, if desired.

As an example, second force generating device 260 may generate a tactile cue force acting in operation on the inceptor 204 when hands-on/off sensor 220 generates a sensor signal indicative of a presence of the vehicle operator. Thus, the second force generating device 260 is sometimes also referred to as tactile cue actuator 260. The tactile cue force may be limited for being overridable by the vehicle operator who operates the inceptor 204 in operation of the vehicle (e.g., helicopter 100 of FIG. 1).

As another example, second force generating device 260 may be provided for generating forces that act on the inceptor 204 to replace the vehicle operator and enable autonomous and/or remotely-controlled operation of the vehicle. Thus, the second force generating device 260 is sometimes also referred to as unmanned operation enabling device 260.

According to one aspect, the second force generating device 260 comprises at least one electrical force generating unit 263, which may be embodied as an electrical motor, in particular a brushless DC motor unit 263. This brushless DC motor unit 263 generates the force that is provided by the second force generating device 260 to the inceptor 204, for example by means of a reversible gear unit 262.

Illustratively, the brushless DC motor unit 263 is controlled by a control and monitoring unit 266 via motor driver 264 that may include an oscillations-damping unit for damping vehicle operator-assisted oscillations and/or vehicle operator-induced oscillations. The motor driver 264 may further comprise a pulse width modulator for controlling the brushless DC motor unit 263 via a suitable pulse width modulated control signal, if desired.

By way of example, the motor driver 264 may generate the suitable pulse width modulated control signal in response to instructions received from the control and monitoring unit 266, that generates these instructions on the basis of sensor information provided at least by a motor position sensor 267 that is associated with the brushless DC motor unit 263.

Motor position sensor 267 may provide electrical current information for torque control. If desired, motor position sensor 267 may provide rotary position information for commutation and torque control. In some embodiments, motor position sensor 267 provides information about the temperature of the brushless DC motor unit 263, especially corresponding motor windings.

In some embodiments, safety unit 261 may disconnect the second force generating device 260 from the inceptor 204.

Illustratively, the safety unit 261, the reversible gear unit 262, the brushless DC motor unit 263, the motor position sensor 267, the control and monitoring unit 266, and the motor driver 264 define the second force generating device 260.

If desired, control and monitoring unit 266 may be connected via a suitable bus to the control and monitoring units 271a, 271b of the automatic motion control system 270 and monitored and controlled by the latter. Automatic motion control system 270 may be adapted for driving the second force generating device 260 on the basis of sensor information.

As shown, first and second force generating devices 240, 260 may be arranged in parallel. In other words, first and second force generating devices 240, 260 may both act directly on inceptor 204.

Illustratively, second force generating device 260 may be installed above a vehicle operator level (e.g., above a cockpit floor of helicopter 100 of FIG. 1). If desired, the second force generating device may be installed elsewhere (e.g., below the cockpit floor of helicopter 100 of FIG. 1).

Figure 2B:
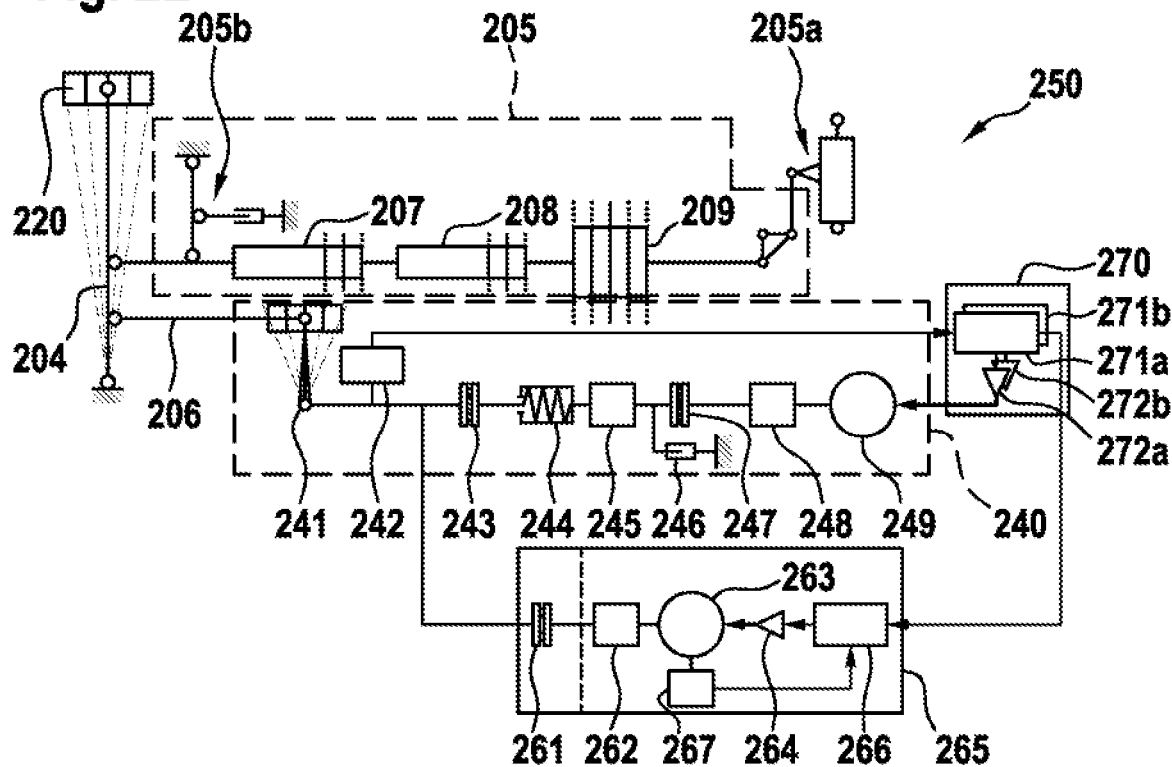
FIG. 2B is a diagram of an illustrative vehicle control system with an unmanned operation enabling device installed below a vehicle operator level in accordance with some embodiments.

FIG. 2B is a diagram of an illustrative vehicle control system 250 with second force generating device 265 installed below a vehicle operator level (e.g., below the cockpit floor of an aircraft). Second force generating device 265 may include safety unit 261, reversible gear unit 262, brushless DC motor unit 263, motor driver 264, control and monitoring unit 266, and motor position sensor 267.

Second force generating device 265 may operate in the same way as second force generating device 260 of FIG. 2A. Thus, the second force generating device 265 is sometimes also referred to as unmanned operation enabling device 265.

However, as shown in FIG. 2B, the parallel first and second force generating devices 240, 265 are connected to the rotary output unit 241 of the first force generating device 240 via safety units 243, 261 that are provided for limiting authority of the first and second force generating devices 240, 260. In particular, internal failures or malfunctions such as jamming may be prevented to have catastrophic impact on the vehicle by means of safety units 243, 261.

Safety units 243, 261 may disconnect the first and second force generating devices 240, 260, respectively, from the inceptor 204, while output, position sensor 242 remains connected to the output unit 241.

Figure 3A:
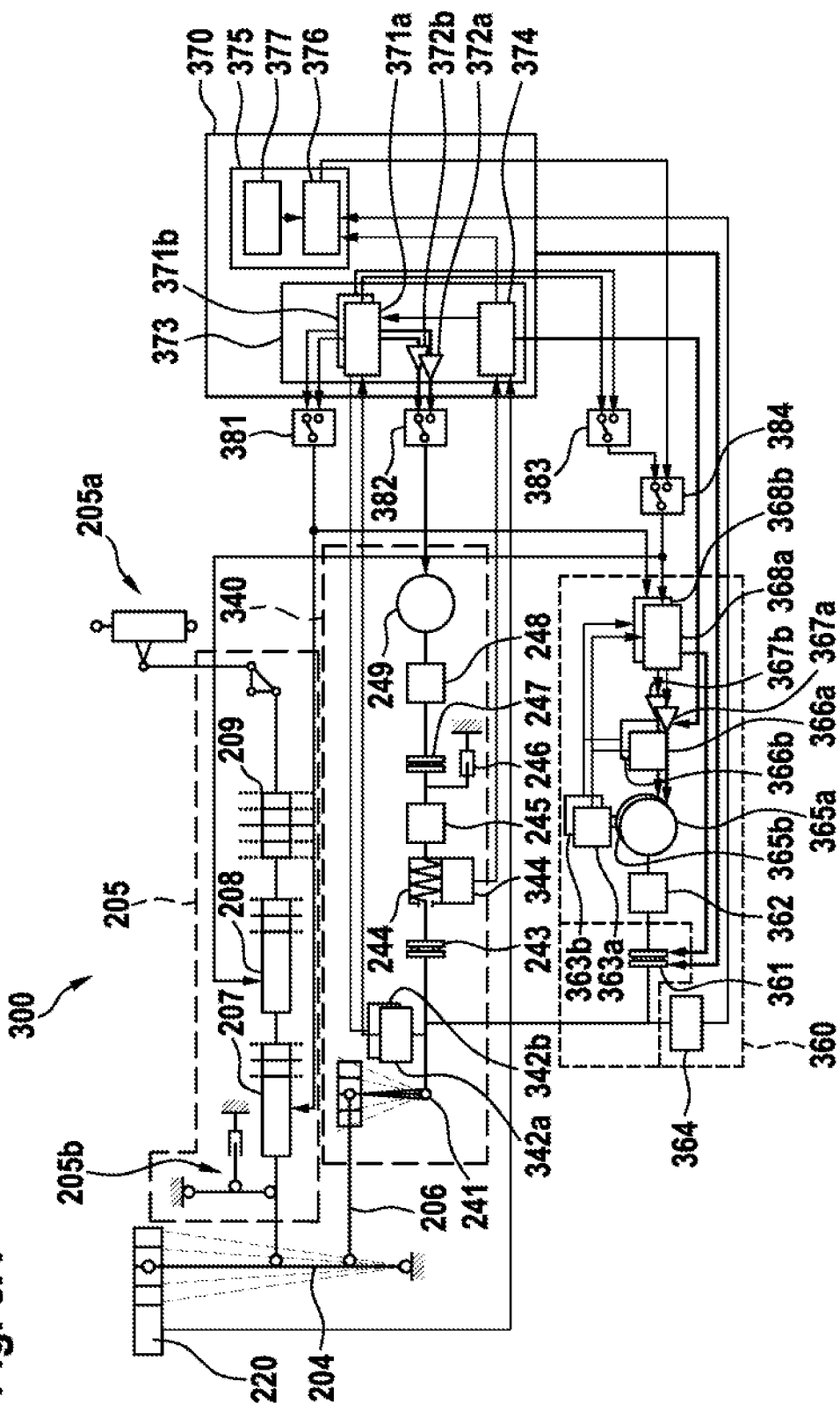
FIG. 3A is a diagram of an illustrative vehicle control system with a duplex increased performance trim actuator (IPTA) in accordance with some embodiments.

FIG. 3A is a diagram of an illustrative vehicle control system 300 for controlling a vehicle having a duplex increased performance trim actuator (IPTA) in accordance with some embodiments. As shown, vehicle control, system 300 may include servo-assisted control unit 205a, mechanical linkage 205 that is coupled to the servo-assisted control unit 205a, inceptor 204 adapted for controlling the servo-assisted control unit 205a via the mechanical linkage 205, hands-on/off sensor 220, 244, first force generating device 340, which is sometimes also referred to as gradient trim actuator 340, second force generating device 360, which is also sometimes referred to as IPTA 360, and decoupling device 361.

First force generating device 340 may be mechanically connected to the inceptor 204 and provided for generating a first force that acts in operation on the inceptor 204. Second force generating device 360 may be mechanically connected to the inceptor 204 in parallel to the first force generating device 340 and provided for generating a second force that acts in operation on the inceptor 204.

Illustratively, vehicle control system 300 may comprise a hands-on/off detection management unit 374. Hands-on/off detection management unit 374 may detect the presence of a vehicle operator and/or whether the vehicle operator is about to intervene in operating the vehicle control system 300. If desired, hands-on/off detection management unit 374 may be coupled to at least one of sensors 220 or 344.

In some embodiments, hands-on/off detection management unit 374 may be decoupled from sensors 220, 344. Hands-on/off detection management unit 374 may include electronic hardware that comprises a logic circuit, for example. If desired, hands-on/off detection management unit 374 may be software based and implemented or embedded in the second force generating device 360 and/or in the automatic motion control system 370.

Hands-on/off sensor 220, 344 may be connected to the inceptor 204 and generate a sensor signal based on detecting a presence of a vehicle operator. Decoupling device 361 may be coupled between the second force generating device 360 and the inceptor 204, wherein the decoupling device 361 mechanically decouples the second force generating device 360 from the inceptor 204 based on the sensor signal.

In some embodiments, decoupling device 361 may be part of second force generating device 360. If desired, decoupling device 361 may be arranged separately from second force generating device 360.

Illustratively, decoupling device 361 may include a clutch 361 that decouples the second force generating device 360 from the inceptor 204 when the sensor signal from hands-on/of sensor 220, 344 is indicative of an absence of the vehicle operator.

By way of example, the clutch 361 couples the second force generating device 360 to the inceptor 204 when the sensor signal from hands-on/off sensor 220, 344 is indicative of the presence of the vehicle operator or when the first force generating device 340 is defective.

If desired, vehicle control system 300 may further include mechanical connection 206, automatic motion control system 370, and selector circuits 381, 382, 383, and 384.

First force generating device 340 may include output unit 241, which may be implemented as a rotary output unit. If desired, mechanical connection 206 may couple output unit 241 to inceptor 204. Illustratively, output unit 241 may be connected to output position sensors 342a, 342b that are adapted for monitoring a rotational position of the rotary output unit 241 in operation.

As shown, first force generating device 340 may include at least one mechanical force generating unit 244, which may be implemented as a spring unit 244 that is connected to a safety unit 243. If desired, hands-on/off sensor 344 may be associated with the at least one mechanical force generating unit 244. As an example, hands-on/off sensor 344 may detect the presence of a vehicle operator. If desired, hands-on/off sensor 344 may detect whether a present vehicle operator is about to intervene in controlling the vehicle.

Second force generating device 360 may implement a duplex increased performance trim actuator (IPTA). For example, second force generating device 360 may include safety unit 361, reversible gear unit 362, brushless DC motor units 365a, 365b, motor current sensors 366a, 366b, motor drivers 367a, 367b, control and monitoring units 368a, 368b, motor position sensors 363a, 363b, and output position sensor 364 that may be adapted for monitoring a rotational position of the rotary output unit 241 in operation.

Brushless DC motor units 365a, 365b may generate a force that is provided by second force generating device 360 to the inceptor 204, for example by means of a reversible gear unit 362. Illustratively, the brushless DC motor units 365a, 365b are controlled by respective control and monitoring units 368a, 368b via respective motor drivers 367a, 367b and motor current sensors 366a, 366b.

By way of example, the motor drivers 367a, 367b may generate a suitable pulse width modulated control signal in response to instructions received from the respective control and monitoring unit 368a, 368b, that generates these instructions on the basis of sensor information provided at least by respective motor position sensors 363a, 363b that are associated with the respective brushless DC motor unit 365a, 365b.

Motor position sensors 363a, 363b may provide electrical current information for torque control. If desired, motor position sensors 363a, 363b may provide rotary position information for commutation and torque control. In some embodiments, motor position sensor 363a, 363b may provide information about the temperature of the respective brushless DC motor unit 365a, 365b, especially corresponding motor windings.

As shown, first and second force generating devices 340, 360 may be arranged in parallel. In other words, first and second force generating devices 340, 360 may both act on rotary output unit 241.

If desired, vehicle control system 300 may include automatic motion control system 370. As shown, automatic motion control system 370 may include primary and secondary motion control systems 373, 375. For example, automatic motion control system 370 may be embodied by primary and secondary AFCS 373, 375.

Illustratively, the primary and secondary motion control systems 373, 375 may be mechanically and/or electrically segregated from each other and dissimilar. Primary automatic motion control system 373 may include redundant first and second control and monitoring units 371a, 371b, redundant first and second motor drivers 372a, 372b, and hands-on/off detection management unit 374.

Redundant first and second motor drivers 372a, 372b may each include a pulse width modulator for controlling the brushed DC motor 249 via a suitable pulse width modulated control signal, if desired. Redundant first and/or second control and monitoring unit 371a, 371b may receive a signal from hands-on/off detection management unit 374.

Secondary automatic motion control system 375 may include secondary control and monitoring unit 376 and electronic stand-by instrument 377. Secondary control and monitoring unit 376 may receive a signal from hands-on/off detection management unit 374, if desired.

Hands-on/off detection management unit 374 may receive sensor signals from hands-on/off sensors 220 and 344. Hands-on/off sensor 220 may include pressure-sensitive grips or pedals or electro-static grips or pedals. Hand-on/off sensor 344 may detect the intervention of a vehicle operator by detecting a vehicle operator's force inside first force generating device 340.

If desired, hands-on/off detection management unit 374 may enable or disable safety unit 361, thereby coupling or decoupling second force generating device 360 with or from rotary output unit 241.

If desired, hands-on/off detection management unit 374 may directly or indirectly enable or disable the second force generating device 360. As an example, the hands-on/off detection management unit 374 may enable or disable the second force generating device 360 via the motor driver 276. As another example, hands-on/off detection management unit 374 may interrupt the power supply of the second force generating device 360. As yet another example, the control and monitoring units 368 could be reconfigured so that, the force generated by the second force generating device 360 is minimized at the rotary output unit 241.

Illustratively, hands-on/off detection management unit 374 together with hands-on/off sensors 220 and 344 may enable the detection of a jam and/or a degradation of servo-assisted control unit 205a or other components of vehicle control system 300. As an example, in autonomous or remotely-controlled operation mode (i.e., in unmanned operation mode), a jam and/or a degradation of servo-assisted control unit 205a (e.g., resulting from a jam of the distributor valve or a loss of the hydraulic power supply) may cause hands-on/off sensor 220 and/or 344 to trigger the generation of a sensor signal that is indicative of the presence of a vehicle operator. As another example, in manned operation mode, a jam and/or a degradation of servo-assisted control unit 205a may cause hands-on/off sensor 220 to trigger the generation of a sensor signal that is indicative that a vehicle operator is hands-off (i.e., the sensor signal is indicative of detecting the absence of the vehicle operator or detecting the presence of the vehicle operator and detecting that the vehicle operator is not about to intervene in operating the vehicle control system 300), while hands-on/off sensor 344 may generate a sensor signal that is indicative that the vehicle operator is hands-on (i.e., the sensor signal is indicative of detecting the presence of a vehicle operator and detecting that the vehicle operator is about to intervene in operating the vehicle control system 300).

If desired, vehicle control system 300 may dispense with the generation of tactile cues if both hands-on/off sensors 220, 344 generate a respective sensor signal, that is indicative of the absence of a vehicle operator (i.e., a sensor signal that is indicative that the vehicle operator is hands-off), independent of whether the vehicle control system 300 operates in autonomous or remotely-controlled operation mode or in manned operation mode.

As an example, vehicle control system 300 may decouple second force generating device 360 from rotary output unit 241 (e.g., using decoupling device 361) to dispense with the generation of tactile cues. As another example, vehicle control system 300 may disable the second force generating device 360 to dispense with the generation of tactile cues.

Selector circuits 381, 382, 383, 384, which are sometimes also referred to as switches, may be coupled between automatic motion control system 370 and first and second force generating devices 340, 360. For example, selector circuit 381 may receive a first signal from first control and monitoring unit 371a and a second signal from second control and monitoring unit 371b. Selector circuit 381 may select between the first and second signals and forward the selected signal to control and monitoring unit 368b of second force generating device 360 and to first serial electromechanical actuator 207.

Selector circuit 382 may receive a first signal from first motor driver 372a and a second signal from second motor driver 372b. Selector circuit 382 may select between the first and second signals and forward the selected signal to brushed DC motor unit 249 of first force generating device 340.

Selector circuit 383 may receive a first signal from first control and monitoring unit 371a and a second signal from second control and monitoring unit 371b of the primary motion control system 373. Selector circuit 383 may select between the first and second signals and forward the selected signal, to selector circuit 384.

Selector circuit 384 may receive a first signal from selector circuit 383 and a second signal from secondary control and monitoring unit 376 of secondary motion control system 376. Selector circuit 384 may select between the first and second signals and forward the selected signal to control and monitoring unit 368a of second force generating device 360 and to second serial electromechanical actuator 208. In other words, selector circuit 384 connects one of the primary and secondary motion control system 373, 375 with the second force generating device 360.

Thus, depending on the selections made by selector circuits 381, 382, 383, 384, primary motion control system 373 may control mechanical linkage 205 and first and second force generating devices 340, 360, while secondary motion control system 375 may control mechanical linkage 205 and second force generating device 360. In other words, primary motion control system 373 may be adapted for driving first and second force generating devices, while secondary motion control, system 375 is segregated and independent from the primary motion control system 373 and adapted for driving the second force generating device 360.

Figure 3B:
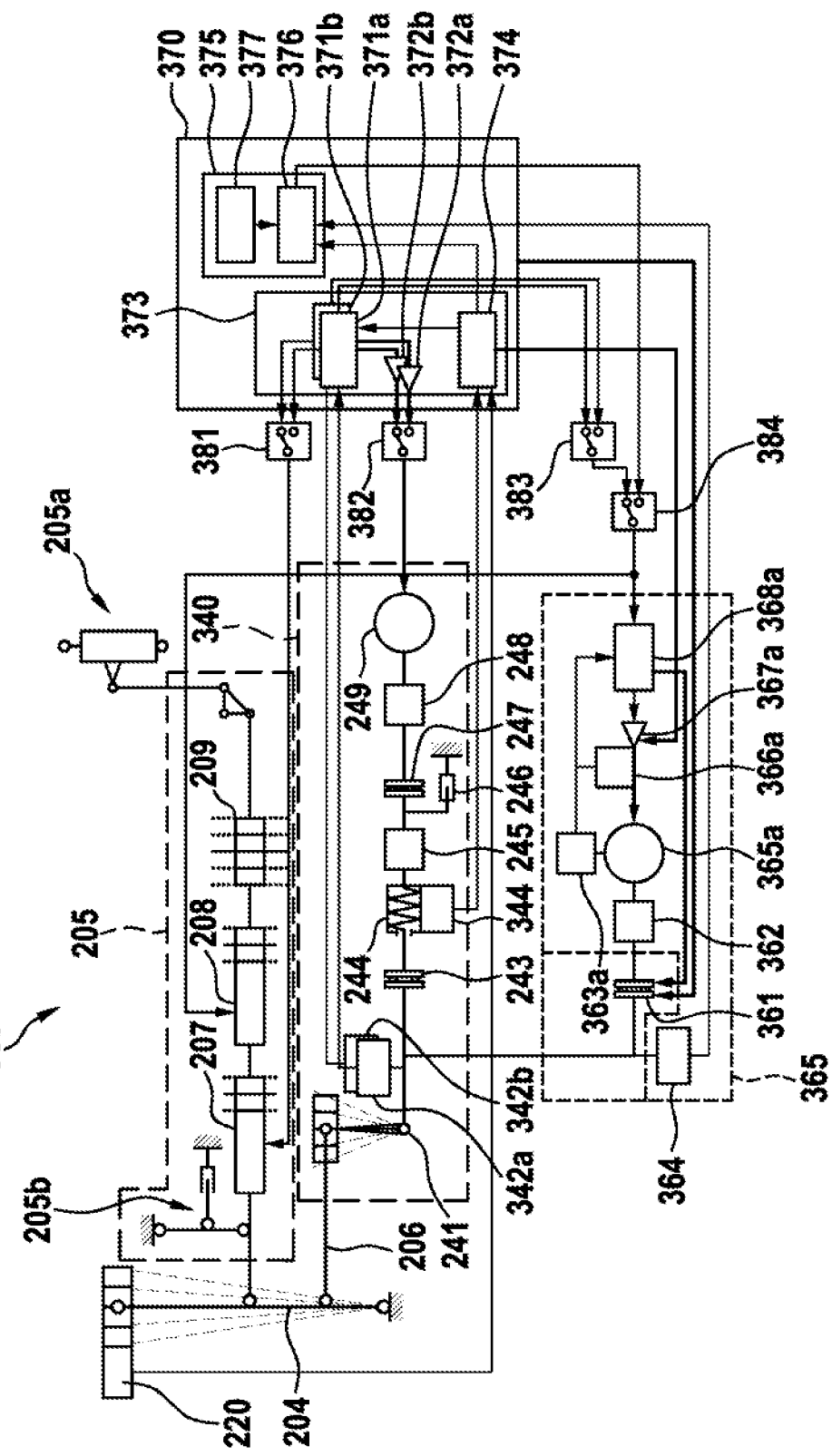
FIG. 3B is a diagram of an illustrative vehicle control system with a simplex increased performance trim actuator (IPTA) in accordance with some embodiments.

FIG. 3B is a diagram of an illustrative vehicle control system 350 with a simplex increased performance trim actuator (IPTA) 365 in accordance with some embodiments.

As shown, vehicle control system 350 may include servo-assisted control unit 205a, mechanical linkage 205 that is coupled to the servo-assisted control unit 205a, inceptor 204 adapted for controlling the servo-assisted control unit 205a via mechanical linkage 205, hands-on/off sensor 220, first force generating device 340, which is sometimes also referred to as gradient trim actuator 340, second force generating device 365, which is also sometimes referred to as IPTA 365, and decoupling device 361, which is sometimes also referred to as safety unit 361.

Second force generating device 365 may implement a simplex increased performance trim actuator (IPTA). For example, second force generating device 365 may include safety unit 361, reversible gear unit 362, output position sensor 340, brushless DC motor unit 365a, motor current sensor 366a, motor driver 367a, control and monitoring unit 368a, and motor position sensor 363a. If desired, safety unit 361 may be arranged outside of second force generating device 365.

Second force generating device 365 may operate in the same way as second force generating device 360 of FIG. 3A. However, compared to the duplex IPTA 360 of FIG. 3A, simplex IPTA 365 lacks the redundant brushless DC motor unit 365b, the redundant motor current sensor 366b, the redundant motor driver 367b, the redundant control and monitoring unit 368b, and the redundant motor position sensor 363b. Thus, as a result, simplex IPTA 365 may have a reduced cost, weight, and size compared to the duplex IPTA 360 of FIG. 3A.

Figure 4:
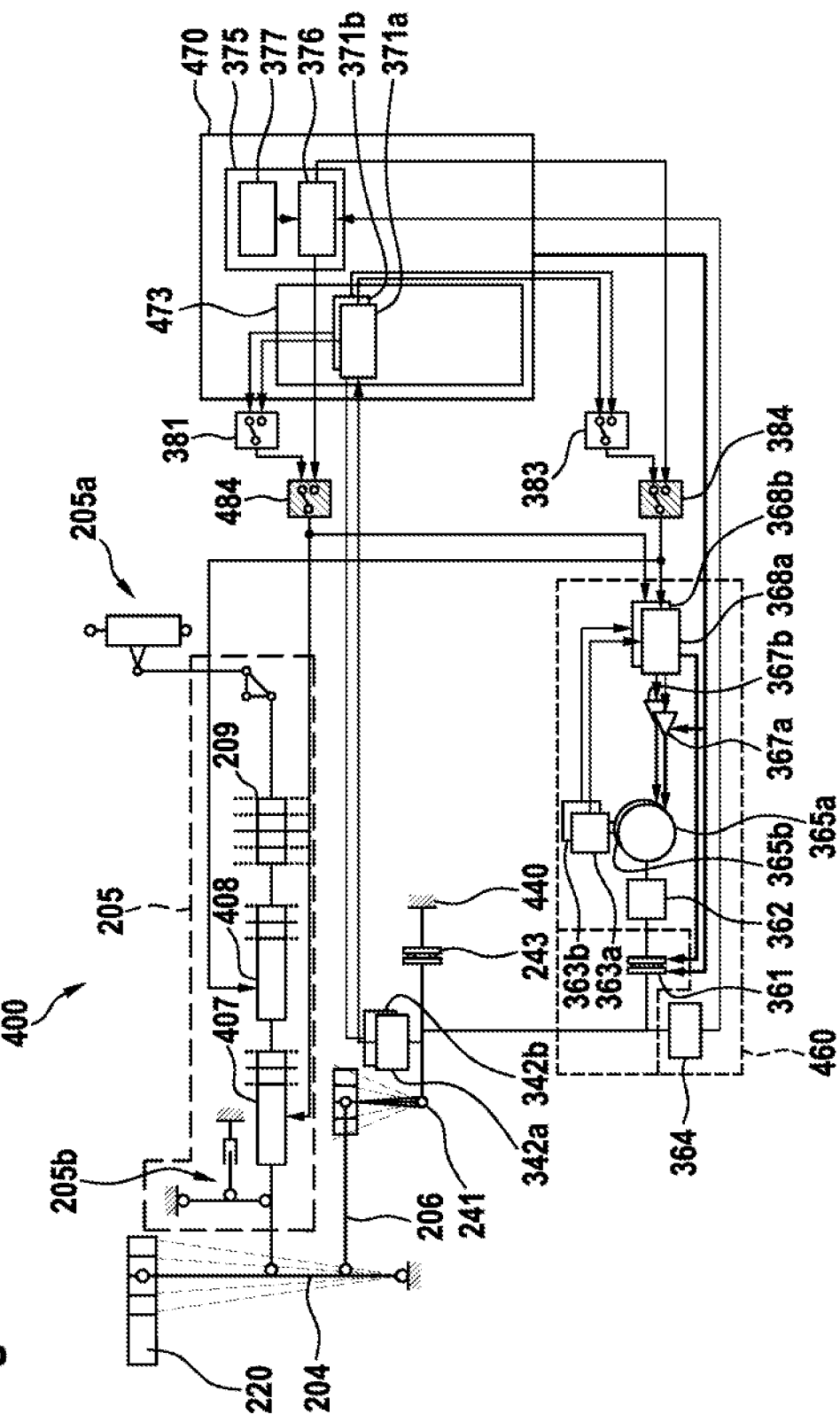
FIG. 4 is a diagram of an illustrative vehicle control system with a duplex increased performance trim actuator (IPTA) and an increased performance serial actuator (IPSA) in accordance with some embodiments.

FIG. 4 is a diagram of an illustrative vehicle control system 400 with a duplex increased performance trim actuator (IPTA) 460 and at least one increased performance serial actuator (IPSA) 407, 408 in accordance with some embodiments.

As shown, vehicle control system 400 may include servo-assisted control unit 205a, mechanical linkage 205 that is coupled to the servo-assisted control unit 205a, inceptor 204 adapted for controlling the servo-assisted control unit 205a via the mechanical linkage 205, hands-on/off sensor 220, friction force generating device 440, second force generating device 460, which is also sometimes referred to as IPTA 460, and decoupling device 361.

Second force generating device 460 may implement a duplex increased performance trim actuator (IPTA). For example, second force generating device 460 may include decoupling device 361, reversible gear unit 362, output position sensor 364 brushless DC motor units 365a, 365b, motor drivers 367a, 367b control and monitoring units 368a, 368b and motor position sensor 363a, 363b. If desired, decoupling device 361 may be arranged outside of second force generating device 460.

Second force generating device 460 may operate in the same way as second force generating device 360 of FIG. 3A. In fact, motor current sensors 366a, 366b of second force generating device 360 were omitted from second force generating device 460 for simplicity of the representation.

If desired, vehicle control system 400 may further include mechanical connection 206, automatic motion control system 470, and selector circuits 381, 383, 384, and 484.

As shown, automatic motion control system 470 may include primary and secondary motion control systems 473, 375. For example, automatic motion control system 470 may include primary and secondary AFCS 473, 375 as primary and secondary motion control systems 473, 375, respectively.

Primary motion control system 473 may include first and second control and monitoring units 371a, 371b. In some embodiments, primary motion control system 473 may include a hands-on/off detection management unit (e.g., hands-on/off detection management unit 374 of FIGS. 3A and 3B).

In the mechanical linkage 205, at least, one serial electromechanical actuator 207, 208 according to FIG. 1, 2A, 2B, 3A, or 3B is replaced by at least one increased performance serial actuator (IPSA) 407, 408. Serial electromechanical actuator 207, 203 according to FIG. 1, 2A, 2B, 3A, or 3B are subject to limited stroke, speed, and force capability. In comparison, increased performance serial actuators (IPSA) 407, 408 are capable of increased stroke, speed and/or force. As an example, an increased performance serial actuator (IPSA) may be capable of at least 20% more stroke, at least 10% more speed, and at least 30% more force than a serial electromechanical actuator.

Selector circuits 381, 383, 384, 484 which are sometimes also referred to as switches, may be coupled between automatic motion control system 470 and increased performance serial actuators 407, 408 and between automatic motion control system 470 and second force generating device 460. For example, selector circuit 381 may receive a first signal from first control and monitoring unit 371a and a second signal from second control and monitoring unit 371b of the primary motion control system 473. Selector circuit 381 may select between the first and second signals and forward the selected signal to selector circuit 484.

Selector circuit 484 may receive a first signal from selector circuit 381 and a second signal from secondary control and monitoring unit 376 of secondary motion control system 375. Selector circuit 484 may select between the first and second signals and forward the selected signal to control and monitoring unit 368b of second force generating device 460 and to first increased performance serial actuators 407. In other words, selector circuit 484 connects one of the primary 473 and secondary motion control system 375 with the second force generating device 460 and with the first increased performance serial actuators 407.

Figure 5:
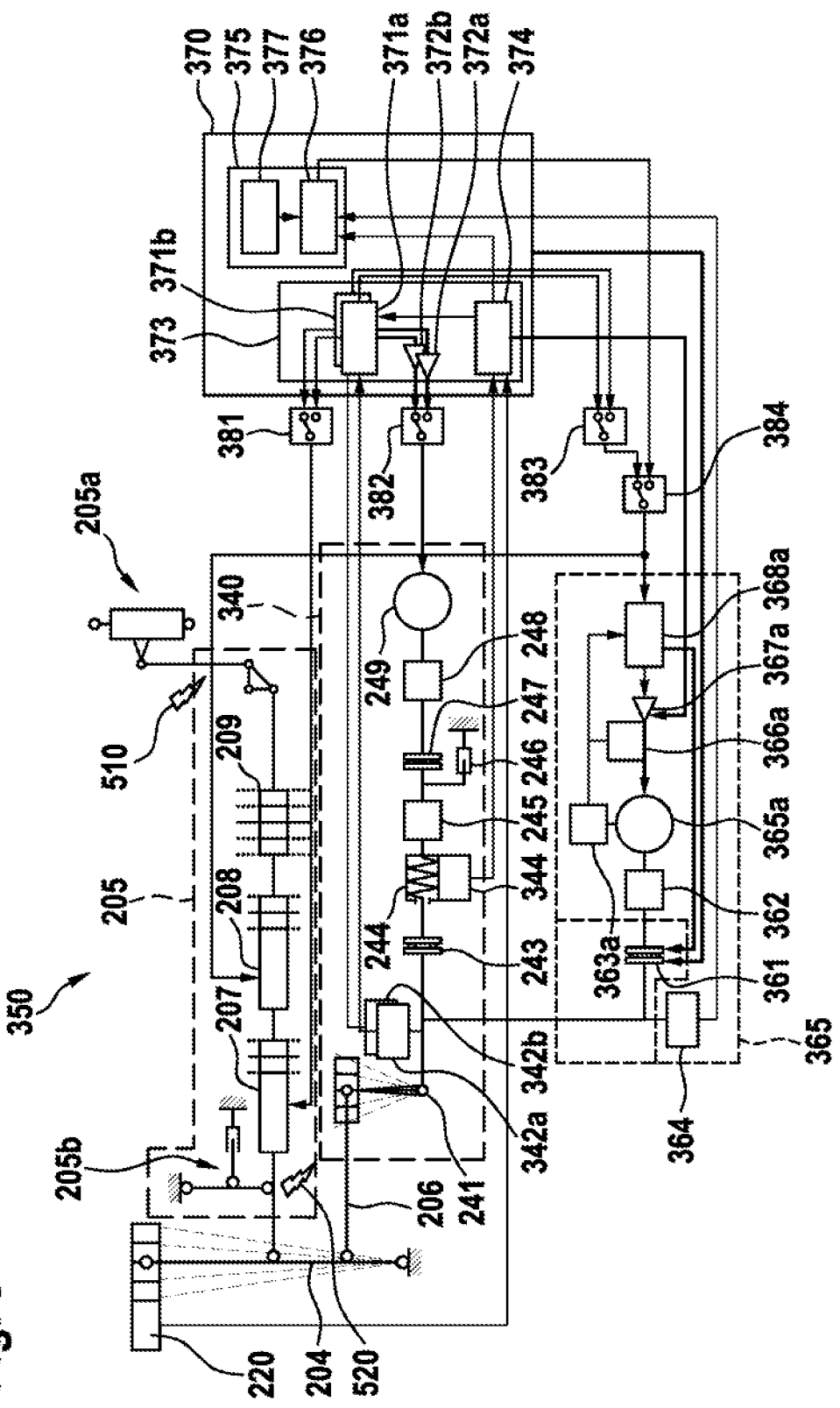
FIG. 5 is a diagram of an illustrative vehicle control system with detection of failure cases and reconfiguration in accordance with some embodiments.
Figure 6:
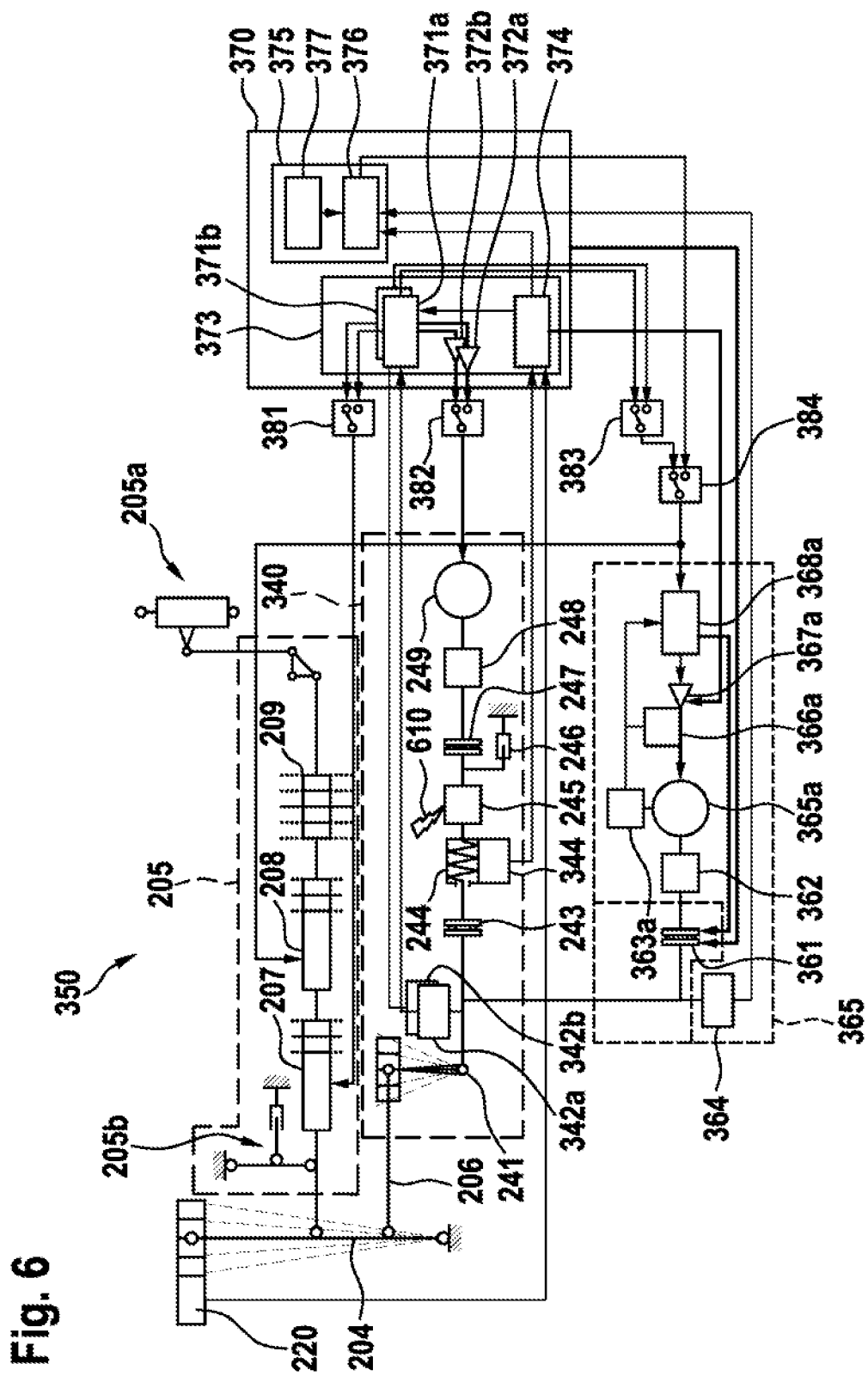
FIG. 6 is a diagram of an illustrative vehicle control system showing a jam of the trim actuator in accordance with some embodiments.
Figure 7:
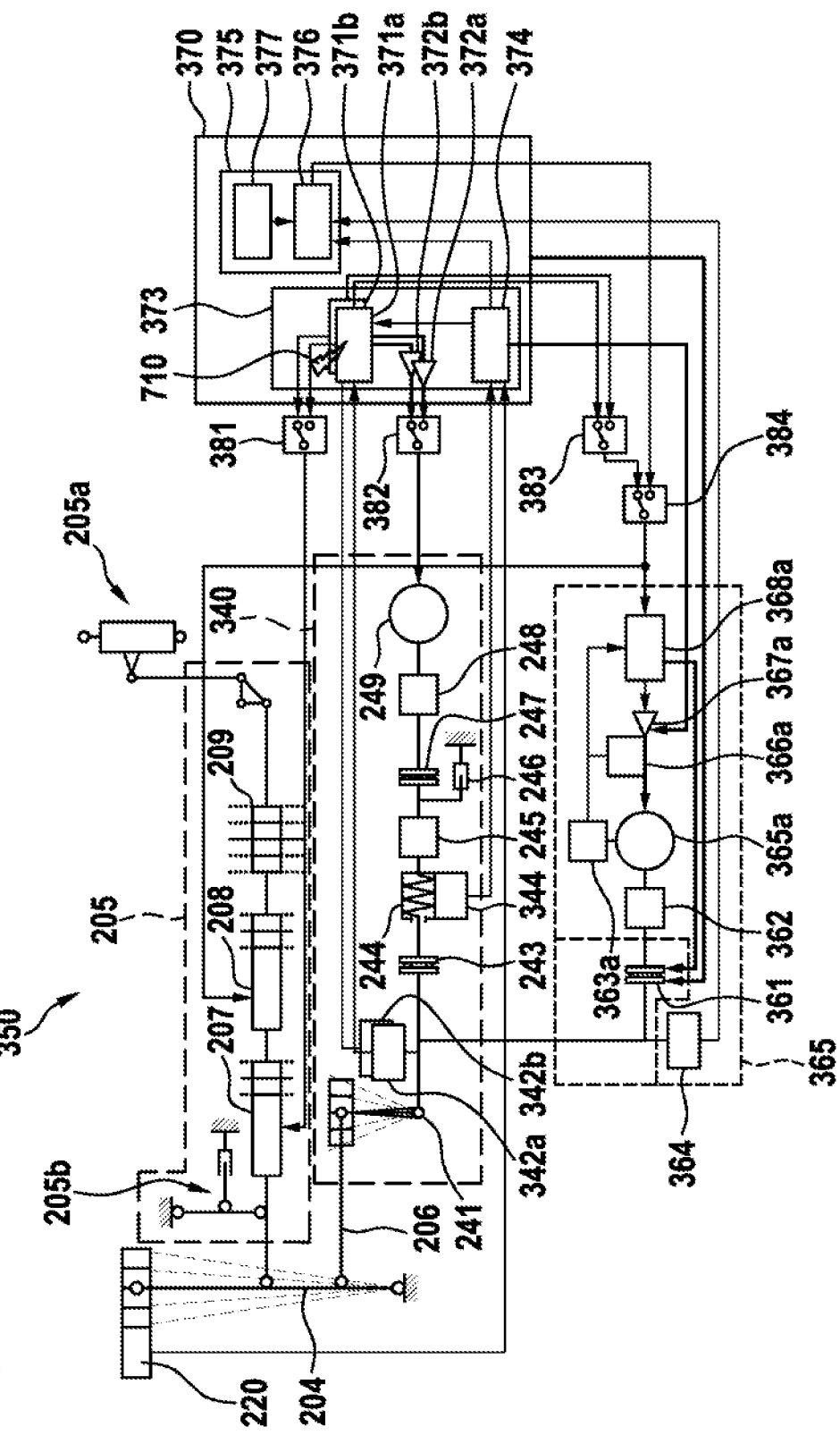
FIG. 7 is a diagram of an illustrative vehicle control system showing a loss or malfunction of a primary AFCS in accordance with some embodiments.

FIGS. 5, 6, and 7 are diagrams of illustrative vehicle control system 350 of FIG. 3B showing the detection of different failure cases and reconfiguration in accordance with some embodiments.

As an example, FIG. 5 shows a degradation 510 of the servo-assisted control unit 205a, which may be detected by hands-on/off detection management unit 374 together with hands-on/off sensors 220 and 344. Illustratively, the degradation 510 of the servo-assisted control unit 205a could be caused by a jam or the hydraulic distributor valve or loss/degradation of the hydraulic power supply of the servo-assisted control unit 205a.

For example, the degradation 510 of the servo-assisted control unit 205a may trigger the generation of a sensor signal that is indicative of the presence of a vehicle operator by hands-on/off sensor 344, while hands-on/off sensor 220 generates a sensor signal that is indicative of the absence of a vehicle operator. In unmanned operation, no additional sensor 220 would be needed to detect the failure based on hands-on/off sensor 344.

The use of an increased performance trim actuator as second force generating device 365 may provide a higher torque and a higher speed than a classical trim actuator, thereby overcoming problems related to the degradation 510 of the servo-assisted control unit 205a.

Illustratively, due to its higher torque capability, the increased performance trim actuator may reliably anchor and position the mechanical linkage 205 in either manned or unmanned operation even after degradation 510, thereby driving the servo-assisted control unit 205a in order to trim the helicopter.

In some scenarios, degradation 510 of the servo-assisted control unit 205a may lead to a loss of the first and/or second serial electromechanical actuator 207, 203 (e.g., caused by the limited force capabilities of the serial electromechanical actuators 207, 208) which may cause a loss of stabilization of the vehicle. In these scenarios, using an increased performance trim actuator as second force generating device 365 provides a higher torque than a classical trim actuator and may thus reliably anchor and quickly move the mechanical linkage 205 to drive the servo-assisted control unit 205a in order to stabilize the helicopter in either unmanned operation or in manned operation when the pilot is hands off.

In some scenarios, a degradation or loss 520 of first, and/or second serial electromechanical actuator 207, 208 may lead to a loss of stabilization of the vehicle. In these scenarios, using an increased performance trim actuator as second force generating device 365 provides a higher speed than a classical trim actuator and may thus reliably anchor and quickly move the mechanical linkage 205 to drive the servo-assisted control unit 205a in order to stabilize the helicopter in either unmanned operation or in manned operation when the pilot is hands off.

As another example, FIG. 6 is a diagram of illustrative vehicle control system 350 of FIG. 3B showing a jam 610 of the first force generating device 340 (e.g., the trim actuator). For example, reversible gear unit 245 may be jammed, which may be detected by output position sensors 342a, 342b, 364.

For example, while the first force generating device 340 is commanded to change the output position, all output position sensors 342a, 342b and 364 may detect no change in the output position, which is indicative of a jam 610 of the first force generating device 340 when no presence of a vehicle operator to intervene in operating the vehicle control system is detected by the hands-on/off detection management unit 374.

The use of an increased performance trim actuator as a second force generating device 366 may mitigate problems related to the jam 610 of the first force generating device 340. If desired, coupling unit 361 may be closed to provide additional torque generated by the second force generating device 365, thereby rupturing safety unit 243 and releasing the jam 610 of the first force generating device 340.

In some embodiments, first and/or second serial electromechanical actuator 207, 208 may be replaced by increased performance serial actuators.

As yet another example, FIG. 7 is a diagram of illustrative vehicle control system 350 of FIG. 3B showing a defect 710 of primary motion control system 373 (e.g., the primary AFCS).

If a failure of the first control and monitoring unit 371a is detected, the vehicle control, system 350 may switch from using the first control and monitoring unit 371a to using the second control and monitoring unit 371b of the primary motion control system 373.

If the switch from the first 371a to the second 371b control and monitoring unit does not mitigate the problem of the defect 710 of the primary motion control system 373, vehicle control system 350 may switch from using the primary motion control system 373 to using the secondary motion control system 375. Thereby, the secondary motion control system 375 may control the trim of the vehicle via selector circuit 384 through second force generating device 365 and stabilize the vehicle via selector circuit 384 through second force generating device 365 and/or through second serial electromechanical actuator 208.

In unmanned operation, the secondary motion control, system 375 may control the trim of the vehicle via selector circuit 384 with second force generating device 365 and stabilize the vehicle via selector circuit 384 with second force generating device 365 and/or with second serial electromechanical actuator 208.

In manned operation, it is preferable to stabilize the vehicle via selector circuit 384 through second serial electromechanical actuator 208 while the vehicle operator may either drive the vehicle manually or trim the vehicle via selector circuit 384 through second force generating device 365.

Figure 8A:
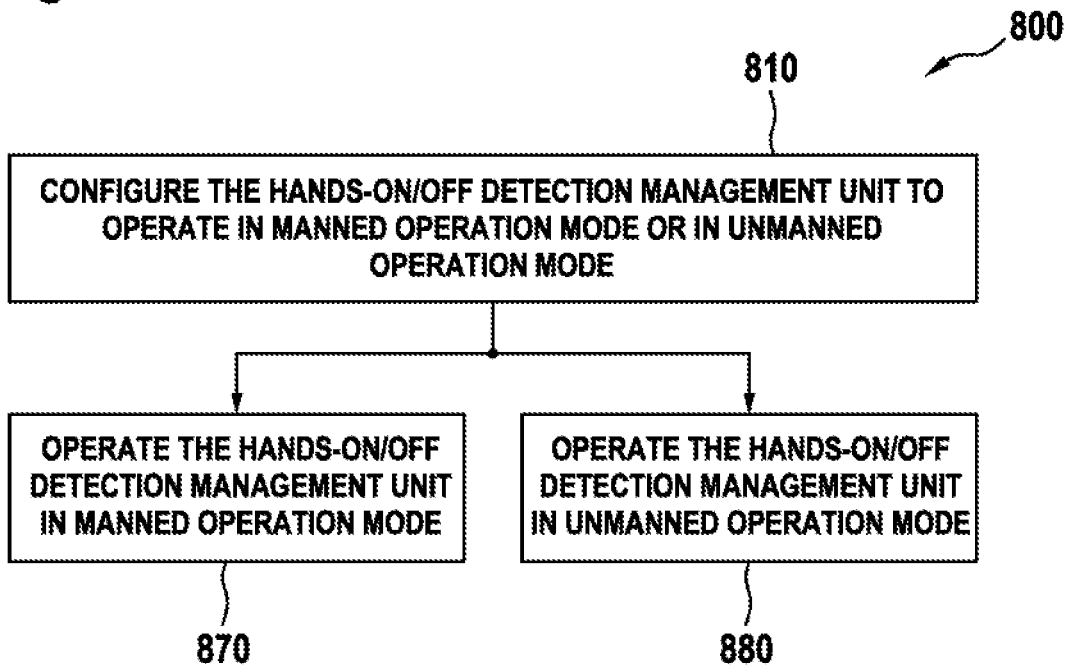
FIG. 8A is a diagram of a flowchart showing illustrative operations that a vehicle control system may perform to control a vehicle in accordance with some embodiments.

FIG. 8A is a diagram of a flowchart 300 showing illustrative operations that a vehicle control system may perform to control a vehicle in accordance with some embodiments.

The vehicle control system (e.g., vehicle control system 300 of FIG. 3A or vehicle control system 350 of FIG. 3B) may control a vehicle and comprise a servo-assisted control unit (e.g., servo-assisted control unit 205a of FIGS. 3A, 3B), a mechanical linkage (e.g., mechanical linkage 205 of FIGS. 3A, 3B) that is coupled to the servo-assisted control unit, an inceptor (e.g., inceptor 204 of FIGS. 3A, 3B) adapted for controlling the servo-assisted control unit via the mechanical linkage, a first force generating device (e.g., first force generating device 340 of FIGS. 3A, 3B) that is mechanically connected to the inceptor, a second force generating device (e.g., force generating device 360 of FIG. 3A or force generating device 365 of FIG. 3B) that is mechanically connected to the inceptor in parallel to the first force generating device, a hands-on/off defection management unit (e.g., hands-on/off detection management unit 374 of FIGS. 3A, 3B) that is connected to the inceptor, and a decoupling device (e.g., decoupling device 361 of FIGS. 3A, 3B) that is coupled between the second force generating device and the inceptor.

During operation 810, the vehicle control system may configure the hands-on/off detection management unit to operate in manned operation mode or in unmanned operation mode. For example, vehicle control system 350 of FIG. 38 may configure the hands-on/off detection management unit 374 to operate in manned operation mode or in unmanned operation mode. If desired, the vehicle control system may store the relevant information in automatic motion control system 370.

If desired, the vehicle control system may include a different setting for operating in manned or unmanned mode that is independent of the hands-on/off detection management unit, and the vehicle control system may configure this setting accordingly. Illustratively, the vehicle control system may operate the servo-assisted control unit, the mechanical linkage, the inceptor, the first force generating device, the second force generating device, the hands-on/off detection management unit, and the decoupling device based on whether the setting indicates a manned or unmanned operation of the vehicle.

In response to configuring the hands-on/off detection management unit to operate in manned operation mode 870, the vehicle control system may operate the hands-on/off detection management unit in manned operation mode. For example, upon storing the relevant information indicative of operating the hands-on/off detection management unit 374 in manned operation mode in automatic motion control system 370, the vehicle control system 350 may operate hands-on/off detection management unit 374 in manned operation mode.

In response to configuring the hands-on/off detection management unit to operate in unmanned operation mode 880, the vehicle control system may operate the hands-on/off detection management unit in unmanned operation mode. For example, upon storing the relevant information indicative of operating the hands-on/off detection management unit 374 in unmanned operation mode in automatic motion control system 370, the vehicle control system 350 may operate the hands-on/off detection management unit 374 in unmanned operation mode.

Figure 8B:
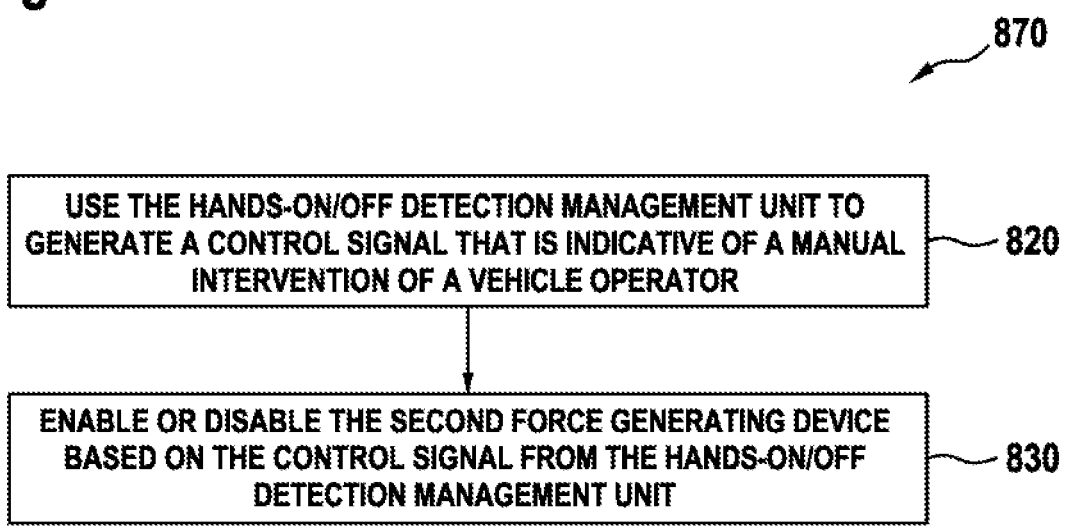
FIG. 8B is a diagram of a flowchart showing illustrative operations that a vehicle control system may perform when the hands-on/off defection management unit is configured to operate in manned operation mode in accordance with some embodiments.

FIG. 8B is a diagram of a flowchart showing illustrative operations that the vehicle control system (e.g., vehicle control system 350 of FIG. 3B) may perform when the hands-on/off detection management unit is configured to operate in manned operation mode in accordance with some embodiments.

During operation 820, the vehicle control system may use the hands-on/off detection management unit to generate a control signal that is indicative of a manual intervention of a vehicle operator. For example, vehicle control system 350 of FIG. 3B may use hands-on/off detection management unit 374 to generate a control signal that is indicative of a manual intervention of a vehicle operator. Illustratively, hands-on/off detection management unit 374 may use hands-on/off sensor 220 and/or hands-on/off sensor 344 to generate a sensor signal that is indicative of a manual intervention of a vehicle operator.

For example, hands-on/off sensor 220 may include pressure-sensitive grips or pedals or electro-static grips or pedals that detect the hands or feet of the vehicle operator on inceptor 204. Hand-on/off sensor 344 may detect the intervention of a vehicle operator by detecting a vehicle operator's force inside first force generating device 340.

During operation 830, the vehicle control system may enable or disable 830 the second force generating device based on the control signal from the hands-on/off detection management unit. For example, vehicle control system 350 of FIG. 3B may enable or disable second force generating device 365 based on the control signal from the hands-on/off detection management unit 374.

For example, vehicle control system 350 may operate the decoupling device 361 that is coupled between the second force generating device 365 and the inceptor 204 based on the control signal.

As an example, in response to the control signal being indicative of a manual intervention of the vehicle operator, vehicle control system 350 may operate decoupling device 361 to couple second force generating device 365 with inceptor 204 such that second force generating device 365 may generate tactile cues that are transmitted from second force generating device 365 to inceptor 204. The tactile cues may be in the form of a counterforce to movements that a vehicle operator performs with inceptor 204.

As another example, in response to the control signal being indicative of no manual intervention of the vehicle operator, vehicle control system 350 may instruct motor driver 367a to deactivate the second force generating device 360, 365 to prevent the creation of the tactile cues by the second force generating device 365.

As yet another example, in response to the control signal being indicative of no manual intervention of the vehicle operator, vehicle control system 350 may operate decoupling device 361 to decouple the second force generating device 365 from inceptor 204 to prevent transmission of tactile cues from second force generating device 365 to inceptor 204.

Figure 8C:
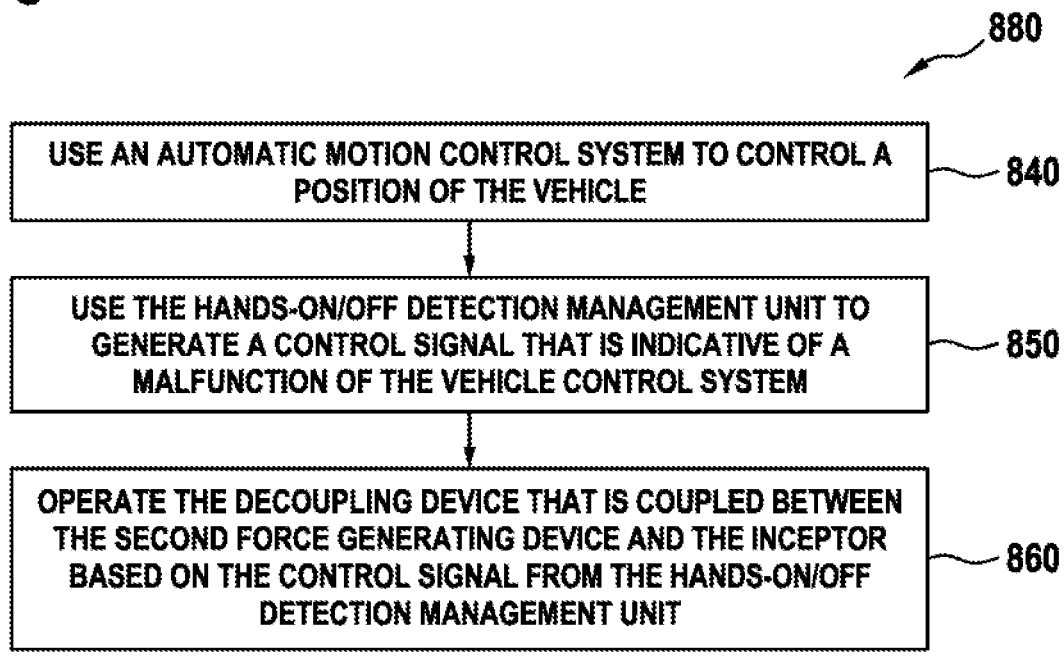
FIG. 8C is a diagram of a flowchart showing illustrative operations that a vehicle control system may perform when the hands-on/off detection management unit is configured to operate in unmanned operation mode in accordance with some embodiments.

FIG. 8C is a diagram of a flowchart showing illustrative operations of operating the vehicle control system (e.g., vehicle control system 350 of FIG. 3B) when the hands-on/off detection management unit is configured to operate in unmanned operation mode in accordance with some embodiments.

During operation 840, the vehicle control system may use an automatic motion control system to control a position of the vehicle. For example, vehicle control system 350 of FIG. 3B may use automatic motion control system 370 to control a position of the vehicle.

During operation 850, the vehicle control system may use the hands-on/off detection management unit to generate a control signal that is indicative of a malfunction of the vehicle control system. For example, vehicle control system 350 of FIG. 3B may generate a control signal that is indicative of a malfunction of the vehicle control system 350.

During operation 860, the vehicle control system may operate the decoupling device that is coupled between the second force generating device and the inceptor based on the control signal from the hands-on/off detection management unit. For example, vehicle control system 350 of FIG. 3B may operate decoupling device 361 that is coupled between second force generating device 365 and inceptor 204 based on the control signal from hands-on/off detection management unit 374. The control signal may be based on a sensor signal from hands-on/off sensor 220 and/or based on a sensor signal from hands-on/off sensor 344.

Figure 8D:
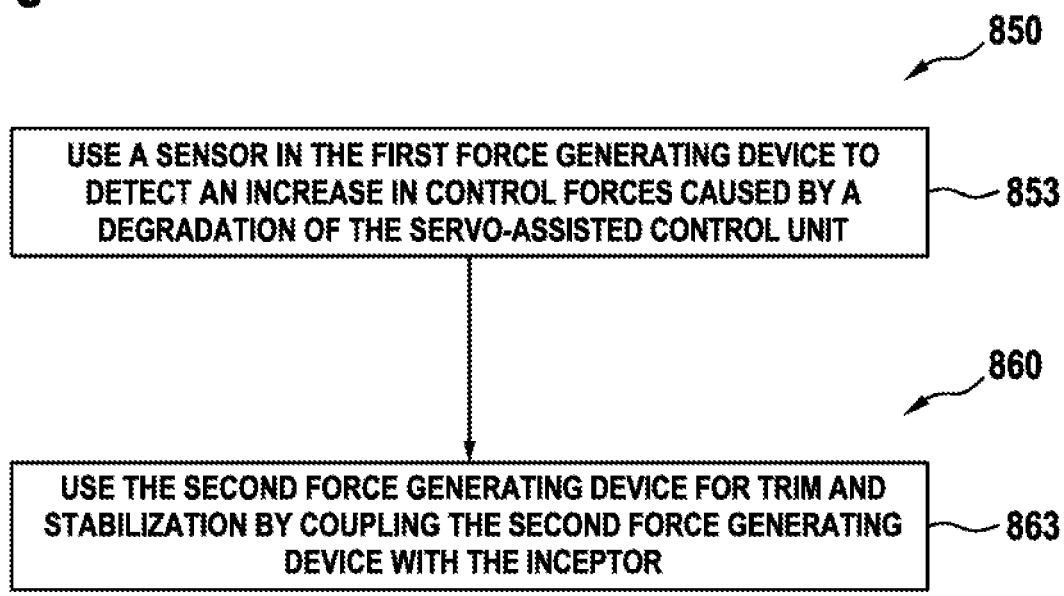
FIG. 8D is a diagram of a flowchart showing illustrative operations that a vehicle control system may perform when handling a malfunction of the vehicle control system in accordance with some embodiments.

FIG. 8D is a diagram of a flowchart showing illustrative operations of using the hands-on/off detection management unit (e.g., hands-on/off detection management unit 374 of FIG. 3B) to generate the control signal that is indicative of a malfunction of the vehicle control system (e.g., vehicle control system 350), and operating the decoupling device (e.g., decoupling device 361) that is coupled between the second force generating device (e.g., second force generating device 365) and the inceptor (e.g., inceptor 204) based on the control signal in accordance with some embodiments.

During operation 853, the vehicle control system may use a sensor in the first force generating device to detect an increase in control forces caused by a degradation of the servo-assisted control unit, and during operation 863, use the second force generating device for trim and stabilization by coupling the second force generating device with the inceptor.

For example, vehicle control system 350 of FIG. 3B may use hands-on/off sensor 344 in first force generating device 340 to detect an increase in control forces caused by a degradation 510 of the servo-assisted control unit 205a and use second force generating device 365 for trim and stabilization by coupling second force generating device 365 with inceptor 204.

Figure 8E:
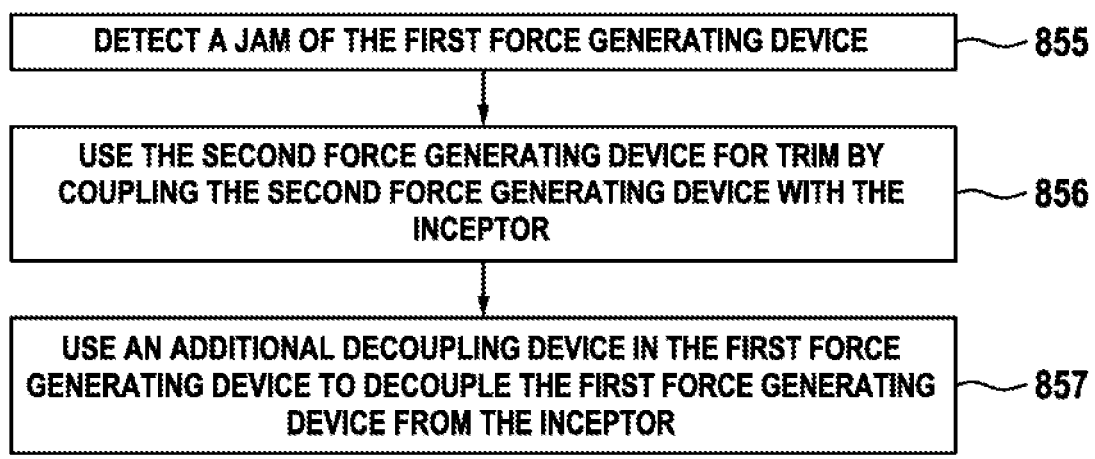
FIG. 8E is a diagram of a flowchart showing illustrative operations for detecting and correcting problems in a vehicle control system in accordance with some embodiments.

FIG. 8E is a diagram of a flowchart showing illustrative operations for detecting and correcting problems in a vehicle control system in accordance with some embodiments.

Illustratively, during normal operation, the vehicle control system (e.g., vehicle control system 350 of FIG. 3B) may use first force generating device 340 for commanding trim of the vehicle. Furthermore, vehicle control system 350 may couple second force generating device 365 to inceptor 204 to provide tactile cues to a vehicle, operator when the hand-on/off detection management unit 374 is configured to operate in manned operation mode and decouple second force generating device 365 from inceptor 204 to prevent unnecessary drag torque at inceptor 204 when the hand-on/off detection management unit 374 is configured to operate in unmanned operation mode.

If desired, vehicle control system 350 may include serial electromechanical actuators 207, 208 and use serial electromechanical actuators 207, 208 for stabilization of the vehicle.

During operations 855 to 857, the vehicle control system may detect a jam of the first force generating device, use the second force generating device for trim by coupling the second force generating device with the inceptor, and use an additional decoupling device in the first force generating device to decouple the first force generating device from the inceptor.

For example, vehicle control system 350 of FIG. 3B may use hands-on/off sensor 344 in first force generating device 340 to detect a jam of first force generating device 340, use second force generating device 365 for trim by coupling second force generating device 365 with inceptor 204, and use decoupling device 243 in first force generating device 340 to decouple first force generating device 340 from inceptor 204.

In some embodiments, vehicle control system 350 of FIG. 3B may detect a jam, malfunction, or loss of second force generating device 365. As a result, vehicle control system 350 may use first force generating device 340 for trim, decouple second force generating device 365 from inceptor, and use serial electromechanical actuators 207, 208 to stabilize the vehicle.

Figure 8F:
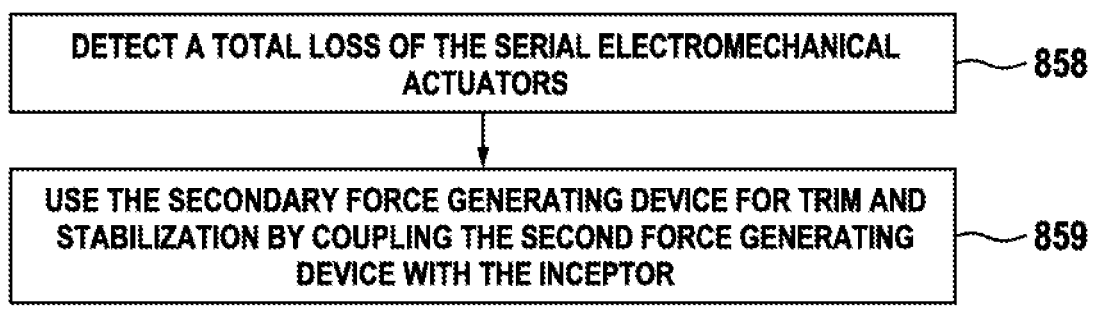
FIG. 8F is a diagram of a flowchart showing illustrative operations for detecting and correcting problems in a vehicle control system that includes serial electromechanical actuators in the mechanical linkage in accordance with some embodiments.

FIG. 8F is a diagram of a flowchart showing illustrative operations for detecting and correcting problems in a vehicle control system that includes serial electromechanical actuators in the mechanical linkage in accordance with some embodiments.

During operations 858 and 859, the vehicle control system may detect a total loss of the serial electromechanical actuators and use the second force generating device for trim and stabilization by coupling the second force generating device with the inceptor.

For example, vehicle control system 350 of FIG. 3B may detect a total loss of serial electromechanical actuators 207, 208 and use second force generating device 365 for trim and stabilization by coupling second force generating device 365 with inceptor 204.

Figure 8G:
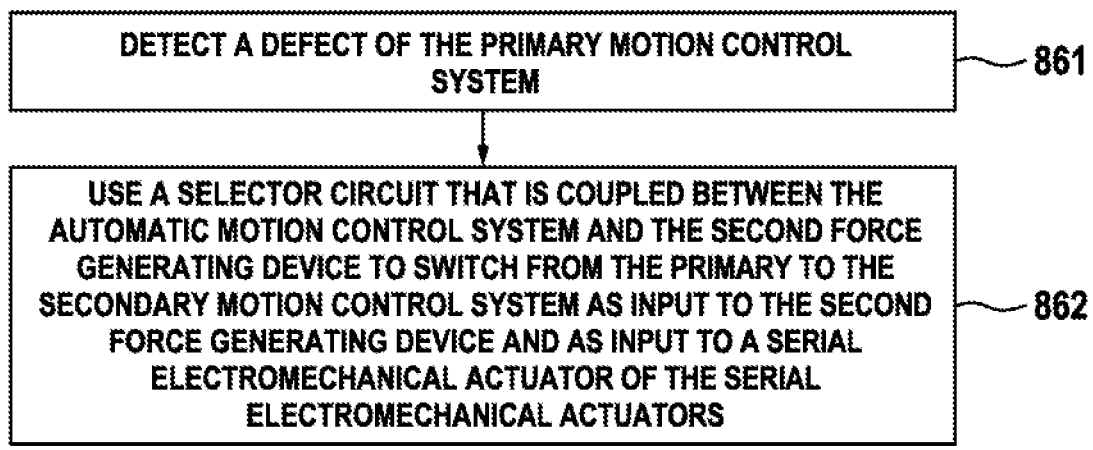
FIG. 8G is a diagram of a flowchart showing illustrative operations for detecting and correcting problems in a vehicle control system that includes serial electromechanical actuators in the mechanical linkage and primary and secondary motion control systems in the automatic motion control system in accordance with some embodiments.

FIG. 8G is a diagram of a flowchart showing illustrative operations for detecting and correcting problems in a vehicle control system that includes serial electromechanical actuators in the mechanical linkage and primary and secondary motion control systems in the automatic motion control system.

During operations 861 and 862, the vehicle control system may detect a defect of the primary motion control system and use a selector circuit that is coupled between the automatic motion control system and the second force generating device to switch from the primary to the secondary motion control system as input to the second force generating device and as input to a serial electromechanical actuator of the serial electromechanical actuators.

For example, vehicle control system 350 of FIG. 3B may detect a defect of primary motion control system 373 and use selector circuit 384 that is coupled between automatic motion control system 370 and second force generating device 365 to switch from primary 373 to secondary motion control system 375 as input to second force generating device 365 and as input, to serial electromechanical actuator 208 of the serial electromechanical actuators 207, 208.

In some embodiments, vehicle control system 350 may distinguish between a defect of primary motion control system 373 that involves a partial loss or degradation of primary motion control system 373 and a defect that involves a total loss of primary motion control system 373.

In case of a partial loss or degradation of primary motion control system, vehicle control system 350 may use selector circuit 383 that is coupled between, automatic motion control system 370 and second force generating device 365 to switch from a first to a second motion control system of primary motion control system 373 and as input to serial electromechanical actuator 208 of the serial electromechanical actuators 207, 208.

Only in case of a total loss of primary motion control system 373, vehicle control system 350 may use selector circuit 384 that is coupled between automatic motion control system 370 and second force generating device 365 to switch from primary 373 to secondary motion control system 375 as input to second force generating device 365 and as input to serial electromechanical actuator 208 of the serial electromechanical actuators 207, 208.

It should be noted that modifications to the above described embodiments are within the common knowledge of the person skilled in the art and, thus, also considered as being part of the present invention.

For instance, the operations 810, 820, 830, 840, 850, 853, 855, 856, 857, 858, 859, 860, 861, 862, 870, 880 were exemplarily described using vehicle control system 350 of FIG. 3B. However, vehicle control system 300 of FIG. 3A or vehicle control system 400 of FIG. 4 may likewise be used to execute operations 810, 820, 830, 840, 850, 853, 355, 856, 857, 858, 859, 860, 861, 862, 870, 880.

Furthermore, mechanical linkage 205 of FIGS. 2A to 7 is shown with first and second serial electromechanical actuators 207, 208, mechanical linkage 209, and friction and dampening unit 205b. However, if desired, mechanical linkage 205 may have a single or more than two serial electromechanical actuators, and/or no friction and dampening unit 205b.

Moreover, first force generating device 340 of FIGS. 3A and 3B are shown to be only controlled by first or second control and monitoring unit 371a, 371b of primary motion control system 373. However, vehicle control system 300, 350 may include an additional selector circuit such that first force generating device 340 may be controlled by first or second control and monitoring unit 371a, 371b of primary motion control system 373 and by control and monitoring unit 367 of secondary motion control system 375.

REFERENCE LIST 100 rotary wing aircraft
101a fuselage
101b tail boom
101c wheel-type landing gear
102 main rotor
102a, 102b rotor blades
102c rotor head
102d rotor mast
103 tail rotor
104 pitch control unit
104a cyclic pitch inceptor
105 mechanical linkage
105a servo-assisted control unit
106 mechanical connection
110 vehicle control system
120 sensor
130, 140 force generating device
144 hands-on/off sensor
160 rotary output unit
161 safety unit, coupling device, decoupling device
170, 180 automatic motion control system
174 hands-on/off detection management unit
200 vehicle control system
204 inceptor
205 mechanical linkage
205a servo-assisted control unit
205b friction and dampening unit
206 mechanical connection
207 first serial electromechanical actuator
208 second serial electromechanical actuator
209 mechanical linkage
220 hands-on/off sensor
240 gradient trim actuator, force generating device
241 rotary output unit
242 output position sensor
243 safety unit, coupling device, decoupling device
244 spring unit, hands-on/off sensor
245 reversible gear unit
246 release damping unit
247 trim release unit, coupling unit
248 irreversible gear unit
249 brushed DC motor unit
250 vehicle control system
260 unmanned operation enabling device, force generating device, tactile cue actuator
261 safety unit, coupling device, decoupling device
262 reversible gear unit
263 brushless DC motor unit
264 motor driver
265 unmanned operation enabling device, force generating device, tactile cue actuator
266 control and monitoring unit 267 motor position sensor
270 automatic motion control system
271a, 271b control and monitoring unit
272a, 272b motor driver
300 vehicle control system
340 gradient trim actuator, force generating device
342a, 342b output position sensor
344 hands-on/off sensor
350 vehicle control system
360 unmanned operation enabling device, force generating device, tactile cue actuator
361 safety unit, coupling device, decoupling device
362 reversible gear unit
363a, 363b motor position sensor
364 output position sensor
365 unmanned operation enabling device
365a, 365b brushless DC motor unit
366a, 366b motor current sensor
367a, 367b motor driver
368a, 368b control and monitoring unit
370 automatic motion control system
371a, 371b control and monitoring unit
372a, 372b motor driver
373 primary motion control system
374 hands-on/off detection management unit
375 secondary motion control system
376 control and monitoring unit
377 electronic stand-by instrument
381, 382, 383, 384 selector circuit
400 vehicle control system
407, 408 unmanned operation enabling device, increased performance serial actuator (IPSA)
440 friction force generating device
460 unmanned operation enabling device, increased performance trim actuator (IPTA), force generating device
470 automatic motion control system
473 primary motion control system
484 selector circuit
510 degradation of the servo-assisted control unit
520 degradation or loss of first and/or second serial electromechanical actuator
610 jam of the first force generating device
710 defect of primary automatic motion control system
800 method
810, 820, 830, 840, 850, 853, 855, 856, 857, 858, 859, 860, 861, 862, 863, 870, 880 operation

What is claimed is:

1. A vehicle control system for controlling a vehicle, comprising:
a servo-assisted control unit;
a mechanical linkage that is coupled to the servo-assisted control unit;
an inceptor adapted for controlling the servo-assisted control unit via the mechanical linkage;
a first force generating device that is mechanically connected to the inceptor and provided for generating a first force that acts in operation on the inceptor;
a second force generating device that is mechanically connected to the inceptor in parallel to the first force generating device and provided for generating a second force that acts in operation on the inceptor;
a hands-on/off detection management unit that is connected to the inceptor, configurable to operate in manned operation mode or in unmanned operation mode, and generates a control signal based on detecting a manual or automatic operation of the vehicle;
a decoupling device that is operable on the basis of the control signal and coupled between the second force generating device and the inceptor, wherein the decoupling device mechanically decouples the second force generating device from the inceptor;
a primary motion control system that is adapted for driving the first and second force generating devices;
a secondary motion control system that is independent from the primary motion control system and adapted for driving the second force generating device; and
a selector circuit that is coupled between the primary and secondary motion control system and the second force generating device, wherein the selector circuit connects one of the primary and secondary motion control system with the second force generating device.

2. The vehicle control system of claim 1, wherein the mechanical linkage further comprises:
at least one serial electromechanical actuator that is coupled between the inceptor and the servo-assisted control unit.

3. The vehicle control system of claim 1, wherein the hands-on/off detection management unit deactivates the second force generating device when the control signal is indicative of an automatic operation of the vehicle and the hands-on/off detection management unit is configured to operate in manned operation mode.

4. The vehicle control system of claim 3, wherein the second force generating device further comprises:
at least one motor driver, wherein the hands-on/off detection management unit instructs the at least one motor driver to deactivate the second force generating device when the control signal is indicative of an automatic operation of the vehicle and the hands-on/off detection management unit is configured to operate in manned operation mode.

5. The vehicle control system of claim 1, wherein the first force generating device further comprises:
a mechanical force generating unit in the first force generating device;
a first sensor in the first force generating device that is coupled to the mechanical force generating unit, generates a first sensor signal based on detecting a manual or automatic operation of the vehicle, and transmits the first sensor signal to the hand-on/off detection management unit; and
a second sensor that is dissimilar from the first sensor and coupled to the inceptor, wherein the second sensor generates a second sensor signal based on detecting a manual or automatic operation of the vehicle, and transmits the second sensor signal to the hand-on/off detection management unit.

6. The vehicle control system of claim 1, wherein the decoupling device comprises:
a clutch that decouples the second force generating device from the inceptor when the control signal is indicative of an automatic operation of the vehicle.

7. The vehicle control system of claim 6, wherein the clutch couples the second force generating device to the inceptor when the control signal is indicative of a manual operation of the vehicle or when the first force generating device is defective.

8. A method of operating a vehicle control system that controls a vehicle and comprises a servo-assisted control unit, a mechanical linkage that is coupled to the servo-assisted control unit, an inceptor adapted for controlling the servo-assisted control unit via the mechanical linkage, a first force generating device that is mechanically connected to the inceptor, a second force generating device that is mechanically connected to the inceptor in parallel to the first force generating device, a hands-on/off detection management unit that is connected to the inceptor, and a decoupling device that is coupled between the second force generating device and the inceptor, comprising:
configuring the hands-on/off detection management unit to operate in manned operation mode or in unmanned operation mode;
in response to configuring the hands-on/off detection management unit to operate in manned operation mode:
using the hands-on/off detection management unit to generate a control signal that is indicative of a manual intervention of a vehicle operator, and
enabling or disabling the second force generating device based on the control signal from the hands-on/off detection management unit; and
in response to configuring the hands-on/off detection management unit to operate in unmanned operation mode:
using an automatic motion control system to control a position of the vehicle,
using the hands-on/off detection management unit to generate a control signal that is indicative of a malfunction of the vehicle control system, wherein using the hands-on/off detection management unit further comprises using a sensor in the first force generating device to detect an increase in control forces caused by degradation of the servo-assisted control unit, and
operating the decoupling device that is coupled between the second force generating device and the inceptor based on the control signal from the hands-on/off detection management unit, wherein operating the decoupling device further comprises using the second force generating device for trim and stabilization by coupling the second force generating device with the inceptor.

9. The method of claim 8, wherein enabling or disabling the second force generating device based on the control signal from the hands-on/off detection management unit further comprises:
in response to the control signal being indicative of no manual intervention of the vehicle operator, decoupling the second force generating device from the inceptor.

10. The method of claim 8, further comprising:
detecting a jam of the first force generating device;
using the second force generating device for trim by coupling the second force generating device with the inceptor; and
using an additional decoupling device in the first force generating device to decouple the first force generating device from the inceptor.

11. The method of claim 8, wherein the mechanical linkage comprises serial electromechanical actuators, further comprising:
detecting a total loss of the serial electromechanical actuators; and
using the second force generating device for trim and stabilization by coupling the second force generating device with the inceptor.

12. The method of claim 8, wherein the mechanical linkage comprises serial electromechanical actuators, and wherein the automatic motion control system comprises a primary motion control system and a secondary motion control system, further comprising:
detecting a defect of the primary motion control system; and
using a selector circuit that is coupled between the automatic motion control system and the second force generating device to switch from the primary to the secondary motion control system as input to the second force generating device and as input to a serial electromechanical actuator of the serial electromechanical actuators.

13. A method of operating a vehicle control system that controls a vehicle and comprises a servo-assisted control unit, a mechanical linkage that is coupled to the servo-assisted control unit, an inceptor adapted for controlling the servo-assisted control unit via the mechanical linkage, a first force generating device that is mechanically connected to the inceptor, a second force generating device that is mechanically connected to the inceptor in parallel to the first force generating device, a hands-on/off detection management unit that is connected to the inceptor, and a decoupling device that is coupled between the second force generating device and the inceptor, comprising:
configuring the hands-on/off detection management unit to operate in manned operation mode or in unmanned operation mode;
in response to configuring the hands-on/off detection management unit to operate in manned operation mode:
using the hands-on/off detection management unit to generate a control signal that is indicative of a manual intervention of a vehicle operator, and
enabling or disabling the second force generating device based on the control signal from the hands-on/off detection management unit;
in response to configuring the hands-on/off detection management unit to operate in unmanned operation mode:
using an automatic motion control system to control a position of the vehicle,
using the hands-on/off detection management unit to generate a control signal that is indicative of a malfunction of the vehicle control system, and
operating the decoupling device that is coupled between the second force generating device and the inceptor based on the control signal from the hands-on/off detection management unit;
detecting a jam of the first force generating device;
using the second force generating device for trim by coupling the second force generating device with the inceptor; and
using an additional decoupling device in the first force generating device to decouple the first force generating device from the inceptor.

14. A method of operating a vehicle control system that controls a vehicle and comprises a servo-assisted control unit, a mechanical linkage that is coupled to the servo-assisted control unit and comprises serial electromechanical actuators, an inceptor adapted for controlling the servo-assisted control unit via the mechanical linkage, a first force generating device that is mechanically connected to the inceptor, a second force generating device that is mechanically connected to the inceptor in parallel to the first force generating device, a hands-on/off detection management unit that is connected to the inceptor, and a decoupling device that is coupled between the second force generating device and the inceptor, comprising:
configuring the hands-on/off detection management unit to operate in manned operation mode or in unmanned operation mode;

in response to configuring the hands-on/off detection management unit to operate in manned operation mode:
  using the hands-on/off detection management unit to generate a control signal that is indicative of a manual intervention of a vehicle operator, and
  enabling or disabling the second force generating device based on the control signal from the hands-on/off detection management unit;
in response to configuring the hands-on/off detection management unit to operate in unmanned operation mode:
  using an automatic motion control system that comprises a primary motion control system and a secondary motion control system to control a position of the vehicle,
  using the hands-on/off detection management unit to generate a control signal that is indicative of a malfunction of the vehicle control system, and
  operating the decoupling device that is coupled between the second force generating device and the inceptor based on the control signal from the hands-on/off detection management unit;
detecting a defect of the primary motion control system; and
using a selector circuit that is coupled between the automatic motion control system and the second force generating device to switch from the primary to the secondary motion control system as input to the second force generating device and as input to a serial electromechanical actuator of the serial electromechanical actuators.

* * * * *